US 11,972,514 B2

United States Patent
Chen et al.

(10) Patent No.: US 11,972,514 B2
(45) Date of Patent: Apr. 30, 2024

(54) ANIMATION FILE PROCESSING METHOD AND APPARATUS, COMPUTER-READABLE STORAGE MEDIUM, AND COMPUTER DEVICE

(71) Applicant: TENCENT TECHNOLOGY (SHENZHEN) COMPANY LIMITED, Shenzhen (CN)

(72) Inventors: Renjian Chen, Shenzhen (CN); Xinxing Chen, Shenzhen (CN); Guopeng Qi, Shenzhen (CN); Hailong Gong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 247 days.

(21) Appl. No.: 17/379,964

(22) Filed: Jul. 19, 2021

(65) Prior Publication Data
US 2021/0350600 A1    Nov. 11, 2021

Related U.S. Application Data

(63) Continuation of application No. PCT/CN2020/095004, filed on Jun. 9, 2020.

(30) Foreign Application Priority Data

Jun. 11, 2019    (CN) .......................... 201910502825.6

(51) Int. Cl.
*G06T 13/00*    (2011.01)
*G06T 1/60*    (2006.01)
(Continued)

(52) U.S. Cl.
CPC ............. *G06T 13/00* (2013.01); *G06T 1/60* (2013.01); *G06T 9/00* (2013.01); *G06T 11/60* (2013.01); *G06T 2210/62* (2013.01)

(58) Field of Classification Search
CPC .. G06T 13/00; G06T 1/60; G06T 9/00; G06T 11/60; G06T 2210/62; G06T 9/005; G06T 13/80; H04N 19/136; H04N 19/50
See application file for complete search history.

(56) References Cited

U.S. PATENT DOCUMENTS 6,037,982 A * 3/2000 Coelho ................ H04N 19/192
375/E7.145
2002/0159645 A1  10/2002 Kobayashi
(Continued)

FOREIGN PATENT DOCUMENTS

CN    101031085 A    9/2007
CN    102244786 A    11/2011
(Continued)

OTHER PUBLICATIONS

The World Intellectual Property Organization (WIPO) International Search Report for PCT/CN2020/095004 dated Sep. 10, 2020 6 Pages (including translation).
(Continued)

*Primary Examiner* — Said Broome
*Assistant Examiner* — Donna J. Ricks
(74) *Attorney, Agent, or Firm* — ANOVA LAW GROUP, PLLC

(57) ABSTRACT

An animation file processing method and apparatus, a computer-readable storage medium, and a computer device are provided. The method includes: obtaining a bitmap image sequence corresponding to an original animation file; encoding a differential pixel region between a bitmap image in the bitmap image sequence and a corresponding key bitmap image when the bitmap image is a non-key bitmap image, to obtain an encoded picture corresponding to the bitmap image; and generating an animation export file corresponding to the original animation file according to encoded
(Continued)

pictures corresponding to bitmap images in the bitmap image sequence.

20 Claims, 19 Drawing Sheets

(51) Int. Cl.
   *G06T 9/00* (2006.01)
   *G06T 11/60* (2006.01)

(56) References Cited

U.S. PATENT DOCUMENTS

| | | | |
|---|---|---|---|
| 2005/0175101 A1 | 8/2005 | Honda | |
| 2005/0231513 A1* | 10/2005 | LeBarton | G11B 27/10 345/473 |
| 2008/0071831 A1* | 3/2008 | Reddy | G06F 16/907 |
| 2010/0194758 A1 | 8/2010 | Seah et al. | |
| 2013/0156100 A1* | 6/2013 | Matsui | H04N 19/12 375/240.07 |
| 2014/0092128 A1 | 4/2014 | Nakamura | |
| 2015/0304663 A1* | 10/2015 | Solaja | A63F 13/77 375/240.24 |
| 2018/0255308 A1* | 9/2018 | Yi | H04N 21/44012 |
| 2019/0379926 A1* | 12/2019 | Vari | H04N 21/440281 |
| 2020/0036983 A1 | 1/2020 | Wang et al. | |

FOREIGN PATENT DOCUMENTS

| | | |
|---|---|---|
| CN | 103714558 A | 4/2014 |
| CN | 106937132 A | 7/2017 |
| CN | 107071516 A | 8/2017 |
| CN | 108668170 A | 10/2018 |
| JP | 2002330439 A | 11/2002 |
| JP | 2005260912 A | 9/2005 |
| JP | 2011040808 A | 2/2011 |
| WO | WO 0049559 A2 * | 8/2000 |

OTHER PUBLICATIONS

Japan Patent Office (JPO) The Office Action For JP Application No. 2021-542182 dated Aug. 22, 2022 8 Pages (Translation Included).
China National Intellectual Property Administration (CNIPA) Office Action 1 for 201910502825.6 dated Feb. 21, 2023 9 Pages (including translation).

* cited by examiner

PAG configuration item

General export parameter — Sequence frame export parameter

1410 — 1420

Export version control: beta

TAG Level: 1023

Image compression quality: 80 (0~100)

Reset default

Cancel  OK

PAG configuration item

General export parameter — Sequence frame export parameter

1410 — 1420

Export size upper limit: 720
Key frame interval: 60
Export version list:
Scale ratio/Frame rate
1.00/24.0fps
0.50/12.0fps
0.33/12.0fps
0.25/12.0fps Scale ratio: 1.0   Frame rate: 24

Add version

Delete selected

Reset default

Cancel  OK

FIG. 14B

ANIMATION FILE PROCESSING METHOD AND APPARATUS, COMPUTER-READABLE STORAGE MEDIUM, AND COMPUTER DEVICE

CROSS-REFERENCES RELATED APPLICATIONS

This application is a continuation application of PCT Patent Application No. PCT/CN2020/095004, entitled "ANIMATION FILE PROCESSING METHOD AND APPARATUS, COMPUTER READABLE STORAGE MEDIUM, AND COMPUTER DEVICE" and filed on Jun. 9, 2020, which claims priority to Chinese Patent Application No. 201910502825.6, entitled "ANIMATION FILE PROCESSING METHOD AND APPARATUS, COMPUTER-READABLE STORAGE MEDIUM, AND COMPUTER DEVICE" filed with the China National Intellectual Property Administration on Jun. 11, 2019, the entire contents of both of which are incorporated herein by reference.

FIELD OF THE TECHNOLOGY

The present disclosure relates to the field of computer technologies, and in particular, to an animation file processing method and apparatus, a computer-readable storage medium, and a computer device.

BACKGROUND OF THE DISCLOSURE

To make video content or picture content more vivid and interesting, a user may add an animation effect when editing the video content or the picture content. Essentially, the animation effect is presented according to an animation file, and an animation file may also be referred to as a sticker. A more complex animation effect indicates more animation attribute data included in a corresponding animation file and a larger file size of the animation file.

Currently, developers may implement, in a manner of exporting an animation file by using an open-source plug-in, an animation file that includes a complex animation effect, but exporting the animation file in this manner has relatively low decoding efficiency.

SUMMARY

According to embodiments of the present disclosure, an animation file processing method and apparatus, a computer-readable storage medium, and a computer device are provided.

An animation file processing method is provided, performed by a computer device, the method including: obtaining a bitmap image sequence corresponding to an original animation file; encoding a differential pixel region between a bitmap image in the bitmap image sequence and a corresponding key bitmap image according to a picture encoding mode when the bitmap image is a non-key bitmap image, to obtain an encoded picture corresponding to the bitmap image; and generating an animation export file corresponding to the original animation file according to encoded pictures corresponding to bitmap images in the bitmap image sequence.

An animation file processing apparatus is provided, the apparatus including: an obtaining module, configured to obtain a bitmap image sequence corresponding to an original animation file; an encoding module, configured to encode a differential pixel region between a bitmap image in the bitmap image sequence and a corresponding key bitmap image according to a picture encoding mode when the bitmap image is a non-key bitmap image, to obtain an encoded picture corresponding to the bitmap image; and an exporting module, configured to generate an animation export file corresponding to the original animation file according to encoded pictures corresponding to bitmap images in the bitmap image sequence.

A non-transitory computer-readable storage medium is provided, storing a computer program, the computer program, when executed by a processor, causing the processor to perform: obtaining a bitmap image sequence corresponding to an original animation file; encoding a differential pixel region between a bitmap image in the bitmap image sequence and a corresponding key bitmap image according to a picture encoding mode when the bitmap image is a non-key bitmap image, to obtain an encoded picture corresponding to the bitmap image; and generating an animation export file corresponding to the original animation file according to encoded pictures corresponding to bitmap images in the bitmap image sequence.

A computer device is provided, including a memory and a processor, the memory storing a computer program, the computer program, when executed by the processor, causing the processor to perform: obtaining a bitmap image sequence corresponding to an original animation file; encoding a differential pixel region between a bitmap image in the bitmap image sequence and a corresponding key bitmap image according to a picture encoding mode when the bitmap image is a non-key bitmap image, to obtain an encoded picture corresponding to the bitmap image; and generating an animation export file corresponding to the original animation file according to encoded pictures corresponding to bitmap images in the bitmap image sequence.

Details of one or more embodiments of the present disclosure are provided in the following accompanying drawings and descriptions. Other features and advantages of the present disclosure become apparent from the specification, the accompanying drawings, and the claims.

BRIEF DESCRIPTION OF THE DRAWINGS

FIG. 14B is a schematic diagram of a configuration interface of performing export according to a sequence frame export mode according to an embodiment.

DESCRIPTION OF EMBODIMENTS

To make the objectives, technical solutions, and advantages of the present disclosure clearer and more understandable, the present disclosure is further described in detail below with reference to the accompanying drawings and the embodiments. The specific embodiments described herein are only used for explaining the present disclosure, and are not used for limiting the present disclosure.

Figure 1:
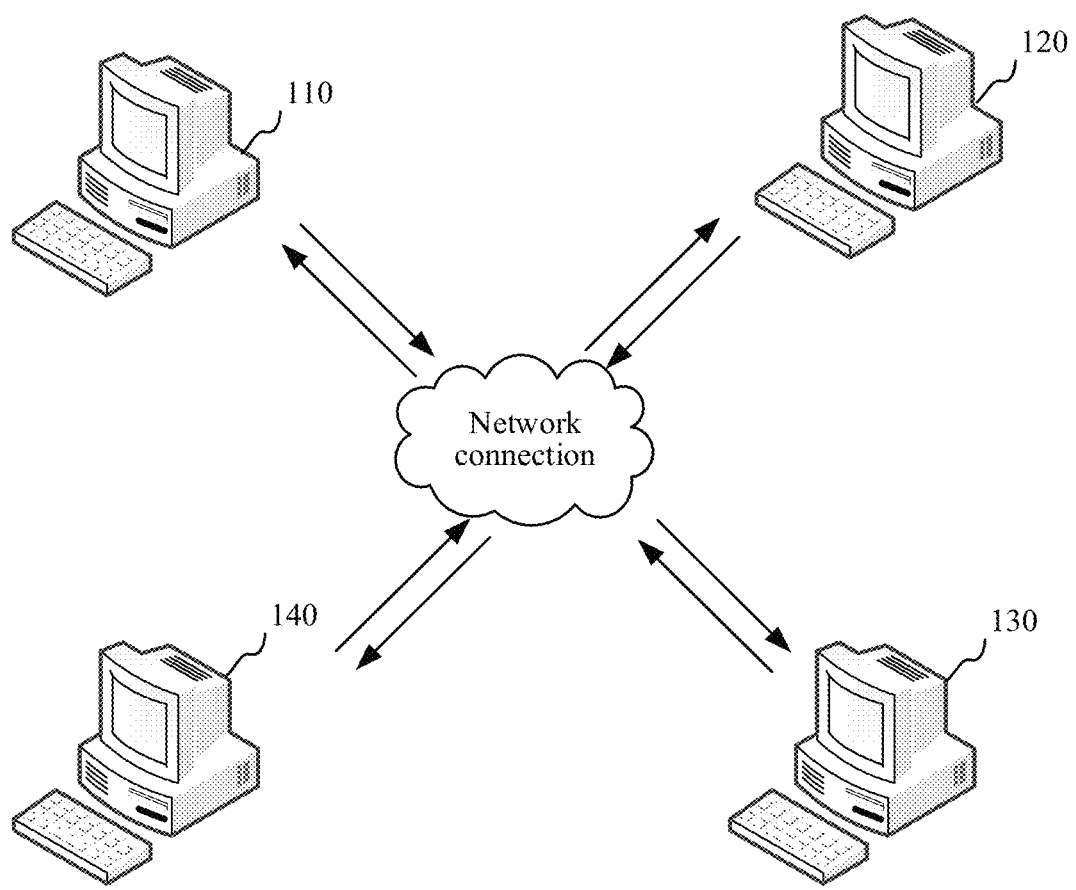
FIG. 1 is a diagram of an application environment of an animation file processing method according to an embodiment.

FIG. 1 is a diagram of an application environment of an animation file processing method according to an embodiment. Referring to FIG. 1, the animation file processing method is applicable to an animation file processing system. The animation file processing system includes an animation file export terminal 110, an animation file preview terminal 120, an animation file verification terminal 130, and an animation file playback terminal 140.

The animation file export terminal 110 may obtain a bitmap image sequence corresponding to an original animation file; encode a differential pixel region between a bitmap image in the bitmap image sequence and a corresponding key bitmap image according to a picture encoding mode when the bitmap image is a non-key bitmap image, to obtain an encoded picture corresponding to the bitmap image; and generate an animation export file corresponding to the original animation file according to encoded pictures corresponding to bitmap images in the bitmap image sequence.

The terminal may perform pixel comparison between the non-key bitmap image in the bitmap image sequence and the corresponding key bitmap image, to obtain the differential pixel region in the non-key bitmap image. The animation export file is an animation file in a target format, for example, may be an animation file in a PAG format.

The animation file export terminal 110 may alternatively obtain a bitmap image sequence corresponding to an original animation file; extract a color channel bitmap and a transparency channel bitmap from each bitmap image in the bitmap image sequence; composite the color channel bitmap with the transparency channel bitmap, to obtain a composite bitmap (e.g., the composite bitmap concatenates the color channel bitmap and the transparency channel bitmap, and may be twice the length or width of the bitmap image); and encode the composite bitmap according to a video encoding mode, to obtain an encoded picture corresponding to the bitmap image; and generate an animation export file corresponding to the original animation file according to encoded pictures corresponding to bitmap images in the bitmap image sequence.

The animation file export terminal 110 may further obtain animation vector data of the original animation file, the animation vector data including animation basic-attribute data and animation layer data; and store the animation basic-attribute data and the animation layer data according to a data structure in a target format, to obtain the animation export file corresponding to the original animation file.

The animation file preview terminal 120 may obtain a time consumption base value obtained in a process of simulating animation playback on a standard machine; obtain a time consumption reference value obtained in a process of locally simulating animation playback; play the animation export file in the target format, to obtain corresponding local time consumption parameters; normalize the local time consumption parameters according to the time consumption base value and the time consumption reference value, to obtain a time consumption parameter of the animation export file; and write at least one of the time consumption parameter of the animation export file and a size of a video memory occupied by the animation export file as a performance parameter of the animation export file into the animation export file.

The animation file verification terminal 130 may obtain the animation export file; parse the animation export file to obtain binary data; search the binary data for a performance parameter identifier; read, in the binary data, a performance parameter representing a running status of the animation file from a data block corresponding to the performance parameter identifier; and perform verification on the animation export file according to the performance parameter.

The animation file playback terminal 140 may obtain an animation export file that is successfully verified, parse the animation export file to obtain animation drawing data, and display playback screens corresponding to the animation export file after performing animation rendering according to the animation drawing data.

The animation file export terminal 110, the animation file preview terminal 120, the animation file verification terminal 130, and the animation file playback terminal 140 may be a same terminal, or may be independent terminals. If the terminals are independent terminals, the terminals may be connected through a network. The terminal may be specifically a desktop terminal or a mobile terminal. The mobile terminal may be specifically at least one of a mobile phone, a tablet computer, a notebook computer, and the like.

Figure 2:
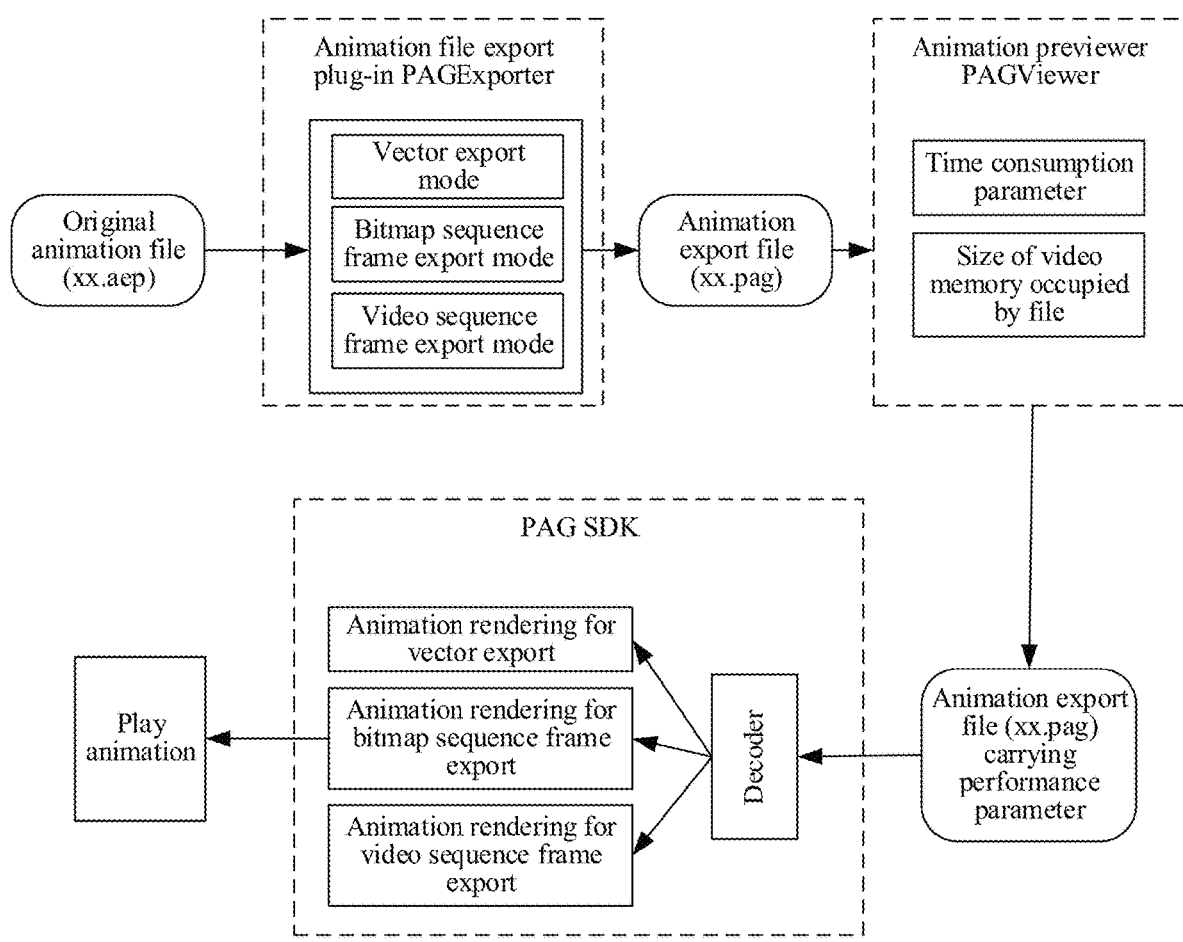
FIG. 2 is a schematic framework diagram of an animation file processing system according to a specific embodiment.

As shown in FIG. 2, in a specific embodiment, an animation file export plug-in PAGExporter in run on the animation file export terminal 110. The animation file export plug-in may be a plug-in that is developed for an AE client and is configured to export an animation export file in a target format. The terminal may process an original animation file (xx.aep) by using the animation file export plug-in PAGExporter, to obtain an animation export file in the target format, for example, a PAG file (xx.pag). Export modes includes a vector export mode, a bitmap sequence frame export mode, and a video sequence frame export mode, and a user may select one of the export modes for export. An animation previewer PAGViewer is run on the animation file preview terminal 120. The animation export file exported by the animation file export terminal 110 may be previewed by using the animation previewer PAGViewer, a time consumption parameter of the animation export file is calculated, and at least one of the time consumption parameter and a size of a video memory occupied by the animation export file is written as a performance parameter of the animation export file into the animation export file. The animation file verification terminal 130 may perform verification on the performance parameters of the animation export file. If the verification succeeds, it indicates that the performance parameter of the animation export file meets a preset condition, and the animation export file can be normally played. A software tool, that is, a PAG SDK, configured to play an animation file is installed on the animation file playback terminal 140. The PAG SDK may be run to implement a decoding module configured to decode the animation export file, and the PAG SDK may further implement a rendering module configured to render and play, in different manners, animation files obtained in different export modes.

Figure 3:
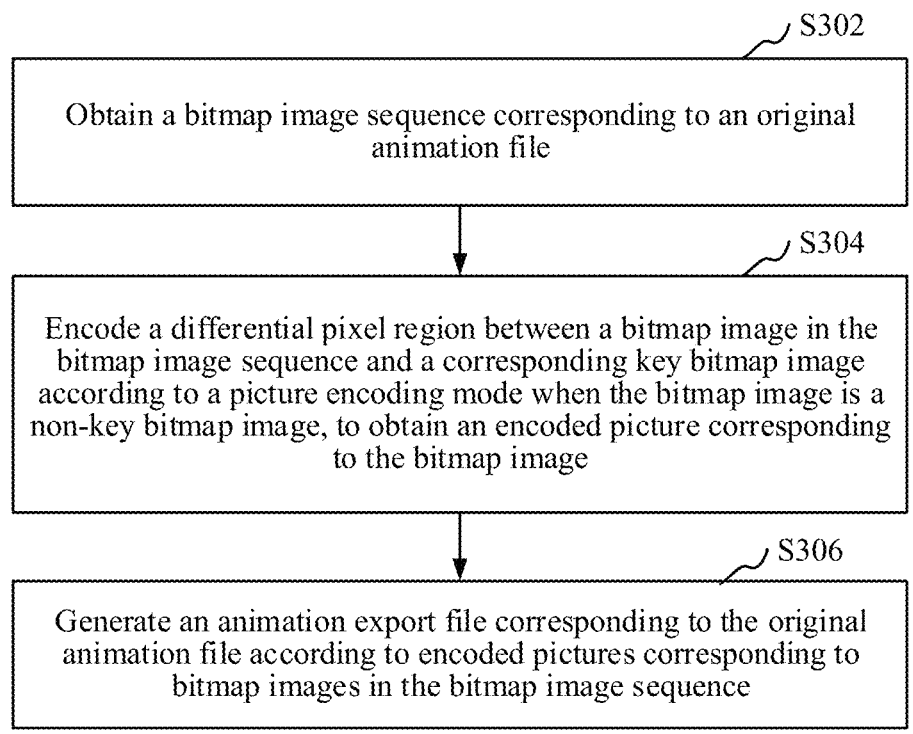
FIG. 3 is a schematic flowchart of an animation file processing method according to an embodiment.

As shown in FIG. 3, in an embodiment, an animation file processing method is provided. This embodiment is mainly described by using an example in which the method is applicable to the foregoing animation file export terminal 110 in FIG. 1. For ease of description, the terminal is directly used for description below. Referring to FIG. 3, the animation file processing method specifically includes the following steps:

S302. Obtain a bitmap image sequence corresponding to an original animation file.

The original animation file is an original animation project file. The animation project file includes animation vector data, which is data used for describing animation effects that can be presented in whole animation, for example, width, height, and position information, transparency, and rotation information of an animation layer. The original animation file may be, for example, a project file with the suffix .aep obtained through Adobe After (AE) software design, and may be obtained by using an AE SDK. The bitmap image, also referred to as a dot matrix image, is an image represented by a pixel array formed by sequentially and orderly arranging single pixels. The bitmap image is an image that has not been subject to compression encoding. The bitmap image sequence is a sequence formed by bitmap images corresponding to frames of animation in the original animation file. In the embodiments provided in the present disclosure, processing is performed based on the original animation file, which, compared with implementing the animation file in a native code mode, can reduce development workload and lower costs.

In an embodiment, the step of obtaining a bitmap image sequence corresponding to an original animation file includes: obtaining the original animation file; playing the original animation file; and sequentially capturing (e.g., in a process of playing the original animation file) screenshots of playback screens corresponding to the original animation file, to obtain the bitmap image sequence corresponding to the original animation file.

Specifically, the terminal may obtain the original animation file, and when playing the original animation file, capture screenshots of playback screens corresponding to the original animation file frame by frame into bitmap images, to obtain the corresponding bitmap image sequence. In an embodiment, a screenshot of each frame of the original animation file may be captured by using a screenshot capturing function of the AE SDK, to obtain a bitmap image corresponding to the each frame, so as to obtain the bitmap image sequence corresponding to the whole original animation file.

S304. Encode a differential pixel region between a bitmap image in the bitmap image sequence and a corresponding key bitmap image according to a picture encoding mode when the bitmap image is a non-key bitmap image, to obtain an encoded picture corresponding to the bitmap image.

The key bitmap image is a bitmap image serving as a key frame in the bitmap image sequence. The bitmap images in the bitmap image sequence are sequentially arranged according to a playback sequence. Compared with preceding bitmap images in the bitmap image sequence, the key bitmap image carries more different image information. Pixel data of each pixel in the key bitmap image is stored into the animation export file after being encoded. Other bitmap images in the bitmap image sequence than the key bitmap image are non-key bitmap images.

A key bitmap image corresponding to a currently processed bitmap image is a bitmap image that serves as a key frame in the bitmap image sequence and that precedes the currently processed bitmap image and is closest to the bitmap image. The currently processed bitmap image may alternatively be the key bitmap image in the bitmap image sequence.

Specifically, if the currently processed bitmap image is a non-key bitmap image, the terminal may perform compression encoding on pixel data of each pixel in the differential pixel region, to obtain the encoded picture corresponding to the bitmap image. The encoded picture is actually picture binary data obtained by compressing the pixel data according to the picture encoding mode. In some embodiments, the picture encoding mode is, for example, a mode in which compression encoding may be performed according to a picture format such as PNG, WebP, or JPEG.

Because the bitmap image is in a picture file format that occupies a relatively large storage space, encoding the differential pixel region according to the picture encoding mode, to obtain an encoded picture in a picture format, can reduce a size of the animation export file. Because a difference between adjacent bitmap images is relatively small, performing pixel comparison between the current bitmap image and the corresponding key bitmap image, to obtain a differential pixel region in the current bitmap image, and encoding only the pixel data of the differential pixel region between the current bitmap image and the corresponding key bitmap image, to obtain the encoded picture, can reduce the size of the whole animation export file.

In an embodiment, the differential pixel region is obtained through the following step: performing pixel comparison between the non-key bitmap image in the bitmap image sequence and the corresponding key bitmap image, to obtain the differential pixel region in the non-key bitmap image.

The differential pixel region is a region that is in the currently processed bitmap image and that is formed by pixels having different pixel data from that of the corresponding key bitmap image at same positions. For example, if a pixel A(x, y) in the currently processed bitmap image has different pixel data from that of a pixel A'(x, y) in the corresponding key bitmap image, the pixel A(x, y) is a pixel in the differential pixel region in the currently processed bitmap image. The differential pixel region may alternatively include pixels that have the same pixel data at the same positions. For example, if the differential pixel region is a rectangular region including all pixels that have different pixel data at the same positions, pixels that have the same pixel data at the same positions may be included in the rectangular region. It can be understood that the differential pixel region can have other shapes in other embodiments according to present disclosure. In some embodiments, there may be one or more differential pixel regions for one bitmap image.

Specifically, the terminal may perform pixel comparison between the currently processed bitmap image and the corresponding key bitmap image, to obtain differential pixels between the currently processed bitmap image and the corresponding key bitmap image, and determine the differential pixel region in the currently processed bitmap image according to the differential pixels. The terminal may perform compression encoding on only the pixel data of the each pixel in the differential pixel region, so that the size of the whole animation export file can be reduced.

In an embodiment, the step of performing pixel comparison between the bitmap image in the bitmap image sequence and the corresponding key bitmap image, to obtain a differential pixel region in the bitmap image includes: performing pixel comparison between the bitmap image in the bitmap image sequence and the corresponding key bitmap image, to obtain differential pixels in the bitmap image; and determining the differential pixel region in the bitmap image according to the differential pixels.

Specifically, because sizes of the bitmap images in the bitmap image sequence are the same, the terminal can compare pixel data of the currently processed bitmap image with pixel data of the corresponding key bitmap image pixel by pixel, to obtain differential pixels in the currently processed bitmap image, and then determine the differential pixel region in the bitmap image according to the differential pixels. The differential pixel region may be a region that includes as many determined differential pixels as possible, for example, may be a rectangular region that includes all the differential pixels, or may be a rectangular region that includes 85% of the differential pixels.

In an embodiment, the step of performing pixel comparison between the bitmap image in the bitmap image sequence and the corresponding key bitmap image, to obtain differential pixels in the bitmap image includes: obtaining pixel data of pixels in the key bitmap image corresponding to the non-key bitmap image; obtaining pixel data of pixels in the non-key bitmap image; and comparing pixel data of pixels at same positions, to obtain a comparison result, and determining the differential pixels in the bitmap image according to the comparison result.

The pixels at the same position are pixels corresponding to the same position in the two bitmap images. For example, the pixel A(x, y) in the bitmap image and the pixel A'(x, y) in the corresponding key bitmap image are pixels at the same position.

Specifically, the terminal needs to obtain the pixel data of the pixels in the currently processed bitmap image, further needs to obtain the pixel data of the pixels in the corresponding key bitmap image, and then compares the pixel data of the pixels at the same positions pixel by pixel. If pixel data of the pixels in the bitmap image is different from pixel data of the pixels at the same positions in the corresponding key bitmap image, the pixels in the bitmap image are differential pixels, so that all the differential pixels in the currently processed bitmap image relative to the corresponding key bitmap image can be found.

In an embodiment, the differential pixel region is a rectangular pixel region. The foregoing animation file processing method further includes a step of directly determining whether the currently processed bitmap image is a key bitmap image according to a relationship between a size of the rectangular pixel region and a size of the corresponding key bitmap image, including: determining that the bitmap image is a key bitmap image when a difference between the size of the rectangular pixel region and the size of the bitmap image is less than a preset threshold; and determining that the bitmap image is a non-key bitmap image when the difference between the size of the rectangular pixel region and the size of the bitmap image is greater than the preset threshold.

In an embodiment, the difference between the size of the rectangular pixel region and the size of the bitmap image may be represented by a difference or ratio between quantities of pixels respectively included in the rectangular pixel region and the bitmap image. The difference may alternatively be represented by a ratio between the respective sizes. For example, if the size of the rectangular pixel region is 50*60, and the size of the bitmap image is 100*100, the difference may be represented by (50*60)/(100*100).

Specifically, the terminal may select the first bitmap image in the bitmap image sequence as the key bitmap image, and sequentially perform pixel comparison between the bitmap images in the bitmap image sequence with the preceding and closest key bitmap image according to a sequence of the bitmap images in the bitmap image sequence, to obtain differential pixel regions in the bitmap images. When the differential pixel region is a rectangular pixel region, whether the currently processed bitmap image is a key bitmap image can be determined according to a difference between a size of the rectangular pixel region and a size of the bitmap image. Because a smaller difference between the size of the rectangular pixel region and the size of the bitmap image indicates a larger size of the rectangular pixel region, and the smaller difference between the size of the rectangular pixel region and the size of the bitmap image indicates more differential information between the currently processed bitmap image and the corresponding key bitmap image, the currently processed bitmap image needs to be used as a key bitmap image, and pixel data of pixels in the currently processed bitmap image needs to be stored after being encoded. For a next to-be-processed bitmap image, a key bitmap image corresponding thereto is the currently processed bitmap image. If a difference between the size of the rectangular pixel region and the size of the bitmap image is larger, indicating a smaller size of the rectangular pixel region and less differential information between the currently processed bitmap image and the corresponding key bitmap image, the currently processed bitmap image can be used as a non-key bitmap image. In addition, for the next to-be-processed bitmap image, a key bitmap image corresponding thereto is the key bitmap image corresponding to the currently processed bitmap image. By analogy, rectangular pixel regions in bitmap images in the bitmap image sequence are obtained, and whether the currently processed bitmap image is a key bitmap image can be determined according to the rectangular pixel region.

For example, the terminal may select the first bitmap image in the bitmap image sequence as a key frame, and for the second bitmap image that is subsequently processed, pixel comparison may be performed between the second bitmap image and the first bitmap image (that is, a key bitmap image corresponding to the second bitmap image), to obtain a differential pixel region of the second bitmap image. If the differential pixel region is a rectangular pixel region that includes all pixels having different pixel data at same positions, whether the second bitmap image is the key bitmap image can be determined according to a size of the rectangular pixel region. If the second bitmap image is a non-key bitmap image, the third bitmap image is processed by repeating the foregoing process. If the second bitmap image is a key bitmap image, the second bitmap image is used as a key bitmap image corresponding to the third bitmap image, and the third bitmap image is processed according to the foregoing process. By analogy, differential pixel regions of bitmap images in the bitmap image sequence are obtained.

Figure 4:
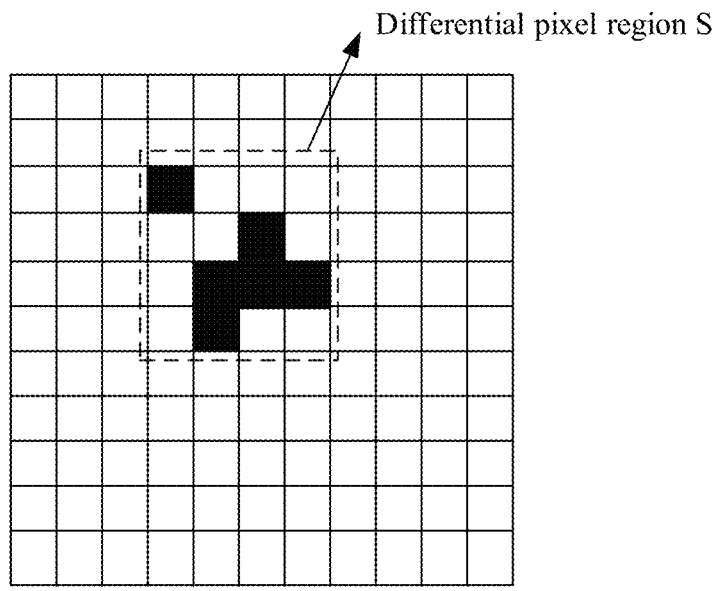
FIG. 4 is a schematic diagram of a differential pixel region obtained by performing pixel comparison between a currently processed bitmap image and a corresponding key bitmap image according to an embodiment.

FIG. 4 is a schematic diagram of a differential pixel region obtained by performing pixel comparison between a currently processed bitmap image and a corresponding key bitmap image according to an embodiment. Referring to FIG. 4, each block is used for representing each pixel, and the currently processed bitmap image has the same image size as the corresponding key bitmap image. After pixel-by-pixel comparison, if pixels having same pixel data are represented by white blocks, and pixels having different pixel data are represented by black blocks, the differential pixel region may be a largest rectangular region including all black blocks, that is, a region S in the figure. The region S may further include a white block.

In an embodiment, when the differential pixel region is a rectangular pixel region, the rectangular pixel region may be represented by coordinates of a starting pixel in the region and a pixel width and a pixel height of the rectangular pixel region. The starting pixel may be represented by a pixel in an upper left corner of the rectangular pixel region. Apparently, the pixel may or may not be a differential pixel, and the pixel width the pixel height of the rectangular pixel region and the coordinates of the starting pixel may be jointly used for locating a position of the differential pixel region in the bitmap image.

In an embodiment, when the currently processed bitmap image is determined as a key bitmap image according to the differential pixel region, compression encoding needs to be performed on pixel data of all the pixels in the currently processed bitmap image. That is, compression encoding is performed on a whole bitmap image. In this case, the whole bitmap image may be essentially understood as the differential pixel region. The starting pixel may be a pixel at (0, 0) by default, the pixel width and the pixel height of the rectangular pixel region may be a pixel width and a pixel height of the bitmap image by default.

In this way, after pixel data of the rectangular pixel region is obtained through decoding according to the animation export file, the position of the differential pixel region may be located in the corresponding key bitmap image according to the coordinates of the starting pixel and the pixel width and the pixel height of the rectangular pixel region, and pixel data at the position located in the key bitmap image is replaced with the pixel data of the rectangular pixel region obtained through decoding, to obtain all the pixel data of currently decoded bitmap images.

In an embodiment, the key bitmap image in the bitmap image sequence may alternatively be determined through the following steps: selecting the first bitmap image in the bitmap image sequence as the key bitmap image; and using a bitmap image at intervals of a preset quantity of bitmap images as a key bitmap image in the bitmap image sequence by using the first bitmap image as a starting image.

That is, the first bitmap image in the bitmap image sequence is used as a first key bitmap image, and pixel data of all pixels in the first bitmap image is stored in the animation export file after being encoded. According to the specified key frame interval, starting from the first bitmap image, a bitmap image at intervals of a preset quantity of bitmap images in the bitmap image sequence is used as a key bitmap image. For example, the bitmap image sequence includes 55 bitmap images. If a key frame interval is set to 10, the first bitmap image, the $11^{th}$ bitmap image, the $21^{st}$ bitmap image, the $31^{st}$ bitmap image, the $41^{st}$ bitmap image, and the $51^{st}$ bitmap image in the bitmap image sequence are all key bitmap images.

If the interval between the key bitmap images is relatively small, key bitmap images and non-key bitmap images in the bitmap image sequence may all be determined according to the foregoing steps, to determine whether the currently processed bitmap image is a key bitmap image according to a position of the currently processed bitmap image in the bitmap image sequence. Certainly, when the interval between the key bitmap images is relatively large, other key bitmap images may also exist in the bitmap image sequence in addition to the key bitmap images selected at a preset interval according to the foregoing steps.

In an embodiment, the foregoing animation file processing method further includes:

directly encoding the bitmap image according to the picture encoding mode when the bitmap image in the bitmap image sequence is a key bitmap image, to obtain an encoded picture corresponding to the bitmap image.

Specifically, when it is determined that the currently processed bitmap image is a key bitmap image, indicating that the bitmap image carries image information most of which is different from that of the preceding key bitmap image, compression encoding needs to be directly performed on pixel data of all pixels in the bitmap image according to the picture encoding mode, and an obtained encoded picture corresponds to the whole bitmap image.

Figure 5:
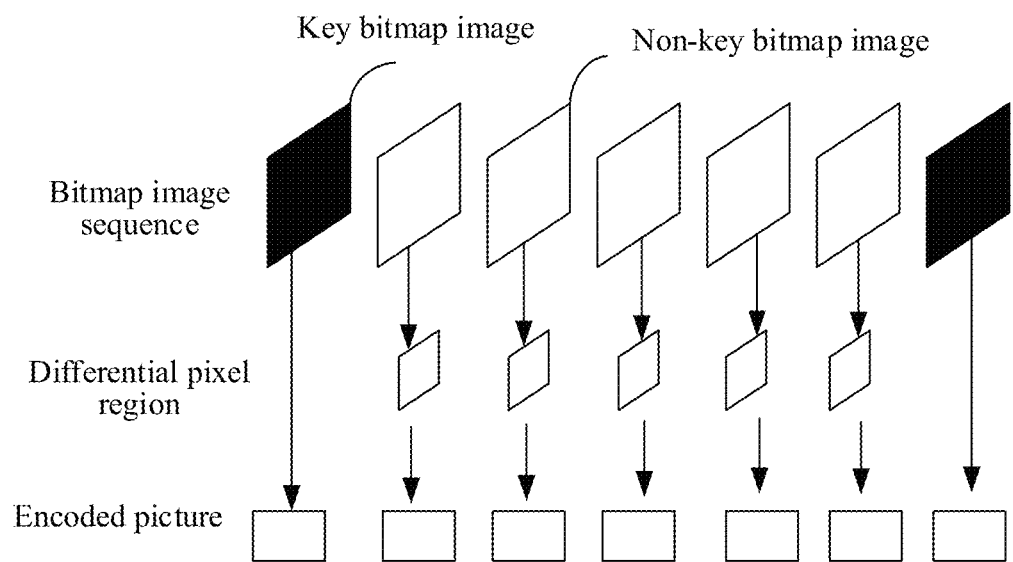
FIG. 5 is a schematic diagram of a bitmap image sequence according to an embodiment.

FIG. 5 is a schematic diagram of a bitmap image sequence according to an embodiment. Referring to FIG. 5, the bitmap image sequence includes a key bitmap image and a non-key bitmap image. For the key bitmap image, compression encoding is directly performed according to a picture encoding mode, to obtain a corresponding encoded picture. For the non-key bitmap image, compression encoding is performed on a differential pixel region according to the picture encoding mode, to obtain an encoded picture corresponding to the bitmap image.

In an embodiment, the differential pixel region is a rectangular pixel region. The foregoing animation file processing method further includes: determining a pixel width and a pixel height that correspond to the rectangular pixel region and coordinates of a starting pixel in the rectangular pixel region; and storing the pixel width, the pixel height, and the coordinates of the starting pixel into picture information corresponding to the encoded picture.

As described above, the starting pixel in the rectangular pixel region may be a pixel in an upper left corner of the rectangular pixel region. The coordinates of the starting pixel and the pixel width and the pixel height that correspond to the rectangular pixel region are stored in binary data corresponding to the encoded picture, and may be used for locating a position of the rectangular pixel region in the bitmap image according to data in the binary data during decoding, and pixel data obtained by decoding the encoded picture is pixel data corresponding to the located position. In this way, the terminal may obtain pixel data corresponding to a whole bitmap image by combining pixel data of the key bitmap image corresponding to the bitmap image with the pixel data of the rectangular pixel region, to display a picture according to the pixel data of the whole bitmap image.

For example, picture information of an encoded picture corresponding to each bitmap image in the bitmap image sequence may be stored in a BitMapRect array. Each element in the array stores picture information of an encoded picture corresponding to each bitmap image, including coordinates of the starting pixel (x, y), a pixel width of a differential pixel region, a pixel height of the differential pixel region, and picture data ByteData. For a key bitmap image, the coordinates of the starting point are (0, 0), and the pixel width of the differential pixel region and the pixel height of the differential pixel region are a pixel width and a pixel height of the key bitmap image respectively.

S306. Generate an animation export file corresponding to the original animation file according to encoded pictures corresponding to bitmap images in the bitmap image sequence.

Specifically, after the encoded pictures corresponding to the bitmap images are obtained, the animation export file in a target format may be generated according to encoded pictures corresponding to bitmap images. The animation export file exported actually stores the picture information of the encoded pictures corresponding to the bitmap images, that is, picture binary data. Certainly, the animation export file exported may further include information used for identifying an export mode of the animation export file, or may further include some basic animation attribute information, such as animation duration, a frame rate, and a background color.

When animation needs to be played, only the animation export file in the target format needs to be decoded, and pictures are sequentially displayed after pixel data of each frame of picture is obtained, so that the animation export file is played. Specifically, when a to-be-displayed picture is a key bitmap image, an encoded picture corresponding to the picture obtained by directly reading the animation export file, and the picture is displayed after pixel data included in the key bitmap image is obtained by decoding the encoded picture. When the to-be-displayed picture is a non-key bitmap image, an encoded picture corresponding to the picture is decoded, to obtain pixel data corresponding to a differential pixel region in the non-key bitmap image, and according to pixel data obtained by decoding an encoded picture corresponding to a key bitmap image corresponding to the picture and a position of the differential pixel region in the corresponding key bitmap image, pixel data corresponding to the position in the key bitmap image may be replaced with the pixel data corresponding to the differential pixel region, to obtain pixel data corresponding to a whole non-key bitmap image, so as to display the picture according to all obtained pixel data.

In the foregoing animation file processing method, processing is performed based on the original animation file, which, compared with implementing the animation file in a native code mode, can reduce development workload and lower costs. In addition, bitmap images in the bitmap image sequence corresponding to the original animation file are converted into the encoded pictures in a picture format for storage, and various animation characteristic data of the original animation file does not need to be stored, provided that frames of encoded pictures are stored, so that all complex animation effects can be supported. In addition, when being decoded, the animation export file needs to be decoded only according to the picture format, thereby achieving high decoding efficiency. Moreover, because a difference between neighboring bitmap images is relatively small, only encoding the pixel data of the differential pixel region to obtain the encoded picture can reduce the size of the whole animation export file.

Figure 6:
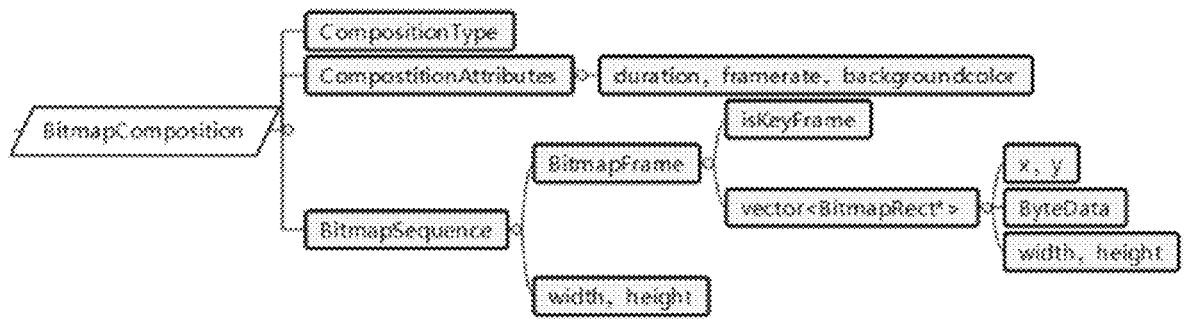
FIG. 6 is a schematic diagram of a data structure of an animation export file obtained by processing an original animation file according to a bitmap sequence frame export mode according to an embodiment.

The animation export file obtained by using the foregoing animation file processing method is actually an animation file in a target format obtained according to a bitmap sequence frame export mode. FIG. 6 is a schematic diagram of a data structure of an animation export file obtained by processing an original animation file according to a bitmap sequence frame export mode according to an embodiment. The whole animation export file is actually formed by frames of pictures, and therefore picture information of the frames of pictures is stored. The stored picture information, when being decoded, is used for display after the frames of pictures are restored. The data structure shown in FIG. 6 defines a specific representation form of the animation export file obtained according to the bitmap sequence frame export mode. After the animation export file is decoded, binary data is converted into an animation object and stored in an internal memory. The following information may be read from the animation object:

BitMapComposition represents the whole animation export file, and includes CompositionType, CompositionAttributes, and BitmapSequence. CompositionType represents a composition type, that is, a mode in which the animation export file is exported, to help parse data according to a corresponding decoding mode. CompositionAttributes represents composition attributes, that is, some basic attributes of the animation export file. CompositionAttributes specifically includes: duration, framerate, and backgroundcolor, where duration represents duration occupied when the whole animation export file is played, framerate represents a frame rate at which animation is played according to the animation export file, and backgroundcolor represents a background color of the animation.

BitmapSequence represents a bitmap sequence, which is a sequence formed by encoded pictures corresponding to bitmap images, and is used for describing picture information of the encoded pictures corresponding to the bitmap images in a bitmap image sequence. BitmapSequence specifically includes a pixel width, width, and a pixel height, height, of a playback screen presented when a whole encoded picture is played after being decoded. BitmapSequence further includes an array, BitmapFrame, formed by the picture information of the encoded pictures corresponding to the bitmap images, and each element in the array includes an isKeyFrame field and a BitmapRect field. isKeyFrame indicates whether the encoded picture is a key frame. BitmapRect represents picture information of the encoded picture, which specifically includes coordinates (x, y) of a starting pixel of a differential pixel region, a pixel width, width, and a pixel height, height, of the differential pixel region, and binary data, ByteData, corresponding to the encoded picture obtained after the differential pixel region is encoded.

In some embodiments, the foregoing animation file processing method further includes the following steps: dividing the bitmap image into a color channel bitmap and a transparency channel bitmap (in other words, extracting a color channel bitmap and a transparency channel bitmap from the bitmap image); compositing the color channel bitmap with the transparency channel bitmap, to obtain a composite bitmap; and encoding the composite bitmap according to a video encoding mode, to obtain an encoded picture corresponding to the bitmap image.

To further reduce the size of the animation export file and also help improve the efficiency of subsequently decoding the animation export file by a client, compression encoding may be performed on the bitmap images in the bitmap image sequence according to the video encoding mode. However, generally, the animation has a transparent effect. That is, the bitmap images in the bitmap image sequence corresponding to the obtained original animation file have transparent channel data. However, video frames in a video sequence do not have the transparent effect and do not have transparent channel data. If the bitmap images in the bitmap image sequence need to be encoded according to the video encoding mode, the bitmap images need to be first converted into non-transparent images.

Specifically, for each bitmap image in the bitmap image sequence, the terminal may read pixel data of the each bitmap image pixel by pixel, separate color data and transparency data from the read pixel data, obtain the corresponding color channel bitmap and transparency channel bitmap according to the separated data, and then combine the color channel bitmap with the transparency channel bitmap, to obtain the composite bitmap corresponding to the bitmap image. The compositing the color channel bitmap and the transparency channel bitmap may be placing the color channel bitmap and the transparency channel bitmap up and down, and a height of the obtained composite bitmap is twice that of the bitmap image. The compositing the color channel bitmap and the transparency channel bitmap may be placing the color channel bitmap and the transparency channel bitmap left and right, and a width of the obtained composite bitmap is twice that of the bitmap image. Further, the terminal may perform compression encoding on the composite bitmaps according to the video encoding mode, to obtain corresponding encoded pictures, and generate an animation export file in a target format according to encoded pictures corresponding to bitmap images, and the animation export file stores picture information of frames of encoded pictures.

The animation export file obtained by using the foregoing animation file processing method is actually an animation file in the target format obtained according to the video sequence frame export mode. The obtained animation export file has a smaller file size, and the animation export file may be decoded according to a video decoding mode, thereby achieving higher decoding efficiency.

In an embodiment, the foregoing animation file processing method further includes the following steps:

obtaining animation vector data of the original animation file, the animation vector data including animation basic-attribute data and animation layer data; and storing the animation basic-attribute data and the animation layer data according to a data structure in a target format, to obtain the animation export file corresponding to the original animation file.

The animation vector data is data used for describing an animation effect that can be presented by the original animation file. The animation is implemented by using a plurality of layers. The animation vector data specifically includes animation layer data of the animation layers, and further includes animation basic-attribute data of a whole original animation file. The data structure in the target format is used for restoring a layer structure of the original animation file. After obtaining the original animation file, the terminal may read the animation vector data corresponding to the layers from the original animation file, and then store the animation vector data according to the data structure in the target format, where the data included in the obtained animation export file is in a one-to-one correspondence with the layer structure of the original animation file. This process is restoring the animation layer structure.

Figure 7:
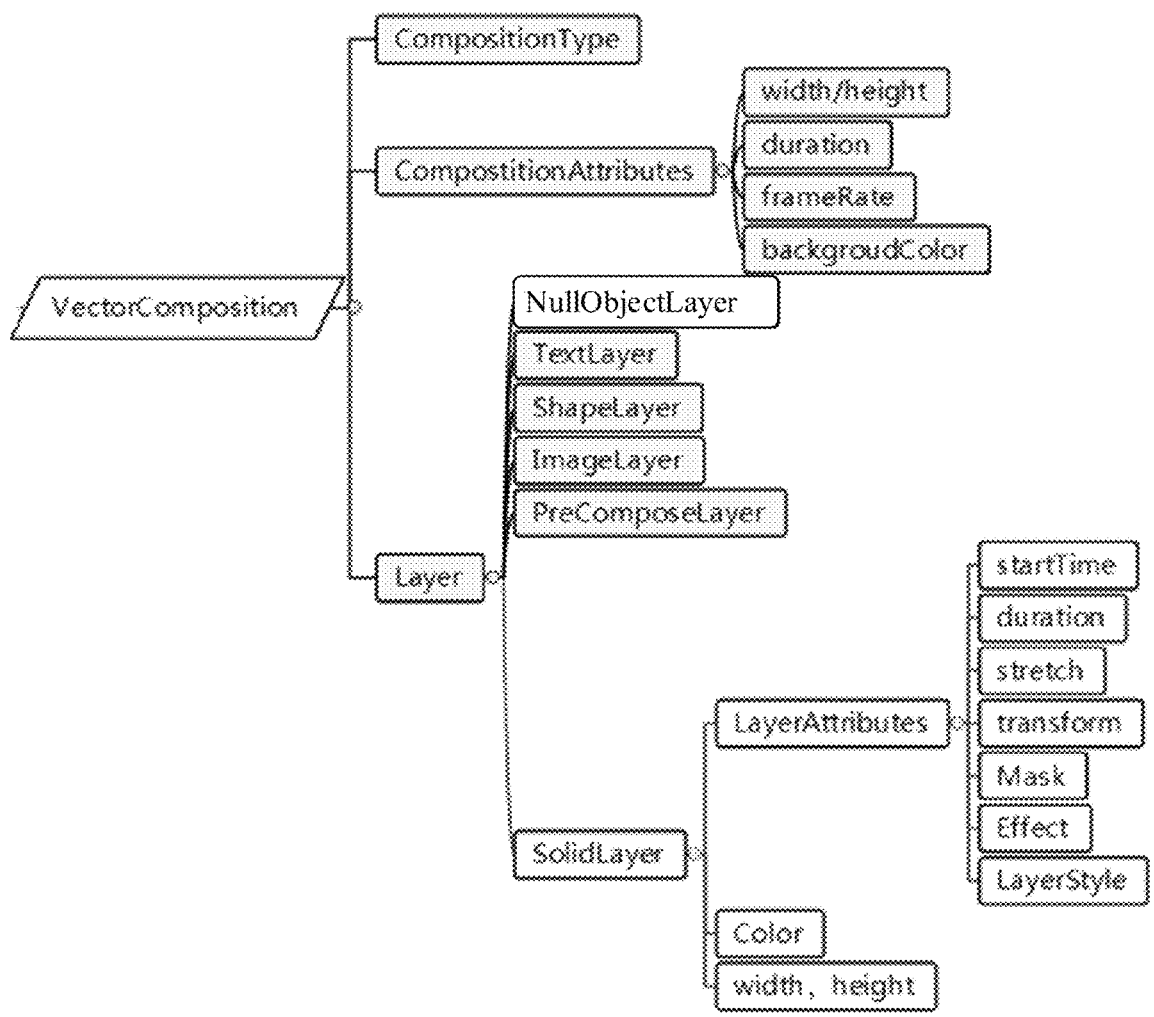
FIG. 7 is a schematic diagram of a data structure of an animation export file obtained by processing an original animation file according to a vector export mode according to an embodiment.

The animation export file obtained by using the foregoing animation file processing method is actually an animation file in the target format obtained according to the vector export mode. FIG. 7 is a schematic diagram of a data structure of an animation export file in a target format obtained by processing an original animation file according to a vector export mode according to an embodiment.

Referring to FIG. 7, the whole animation export file is obtained by compositing layer information of all layers. VectorComposition represents the whole animation export file, and includes CompositionAttributes and Layer. CompositionAttributes represents animation basic-attribute data, includes a width, width, a height, height, and the like of animation, and further includes duration, a frame rate, framerate, a background color, backgroundcolor, and the like of the whole animation. Layer represents animation layer data, and includes data corresponding to the layers. In the original animation file, different types of layers may be used, and may include, but are not limited to, a null object layer (NullObjectLayer), a solid layer (SolidLayer), a text layer (TextLayer), a shape layer (ShapeLayer), an image layer (ImageLayer), and a pre-composite layer (PreComposeLayer).

Using the solid layer as an example, corresponding description information includes a width and a height of the layer, a color, and layer attributes (LayerAttributes), the layer attributes include basic attributes and animation attribute groups, and the basic attributes include layer duration, duration, a layer starting time, startTime (the layer needs to be used when which frame is played), a stretch parameter, stretch, and the like. The animation attribute groups include transform, mask, trackMatter, layerStyle, effect, and content. One layer is obtained by combining any one or more of the six classes of animation attribute groups.

transform is used for recording information of the current layer that transforms with time, including information such as translation, scaling, rotation, and a transparency change. A transformation effect of animation may be restored by recording the information. mask represents a mask within the current layer, and is mainly used for recording a mask mode and drawing path information of the mask. The mask mode includes an Add mode, a Subtract mode, an Intersect mode, and a Difference mode. The Add mode means that the mask is directly added for presentation. The Subtract mode means that a part masked by the mask is subtracted. The Intersect mode means that an intersection between an original graphic and the mask is obtained for presentation. The Difference mode means that a non-intersection between the original graphic and the mask is obtained for presentation. TrackMatter indicates using one layer as a mask of another layer according to transparency and brightness, represents an inter-layer mask, and also records mask mode information and mask drawing information of the mask, except for that a mode herein is different from Mask. TrackMatter has several modes: an Alpha mode, indicating that a display region is controlled according to a non-transparent region of the layer; an AlphaInverted mode, indicating, on the contrary, that a display region of the layer is controlled according to a transparent region of the layer; and a Luma mode and a LumaInverted mode, of which working principles are similar to that of the Alpha mode, indicating that the display region is controlled according to the brightness of the layer. LayerStyle and Effect are used for recording filter information of the current layer. content represents drawable elements of the layer, and includes a picture element, a text element, a shape element, and the like.

The animation file in the target format obtained according to the vector export mode can support rich animation special effects, has an extremely small export file, supports the logic of having drawing data of the buffered layer only when rendering, and further supports in editing text content and picture content in the animation.

Figure 8:
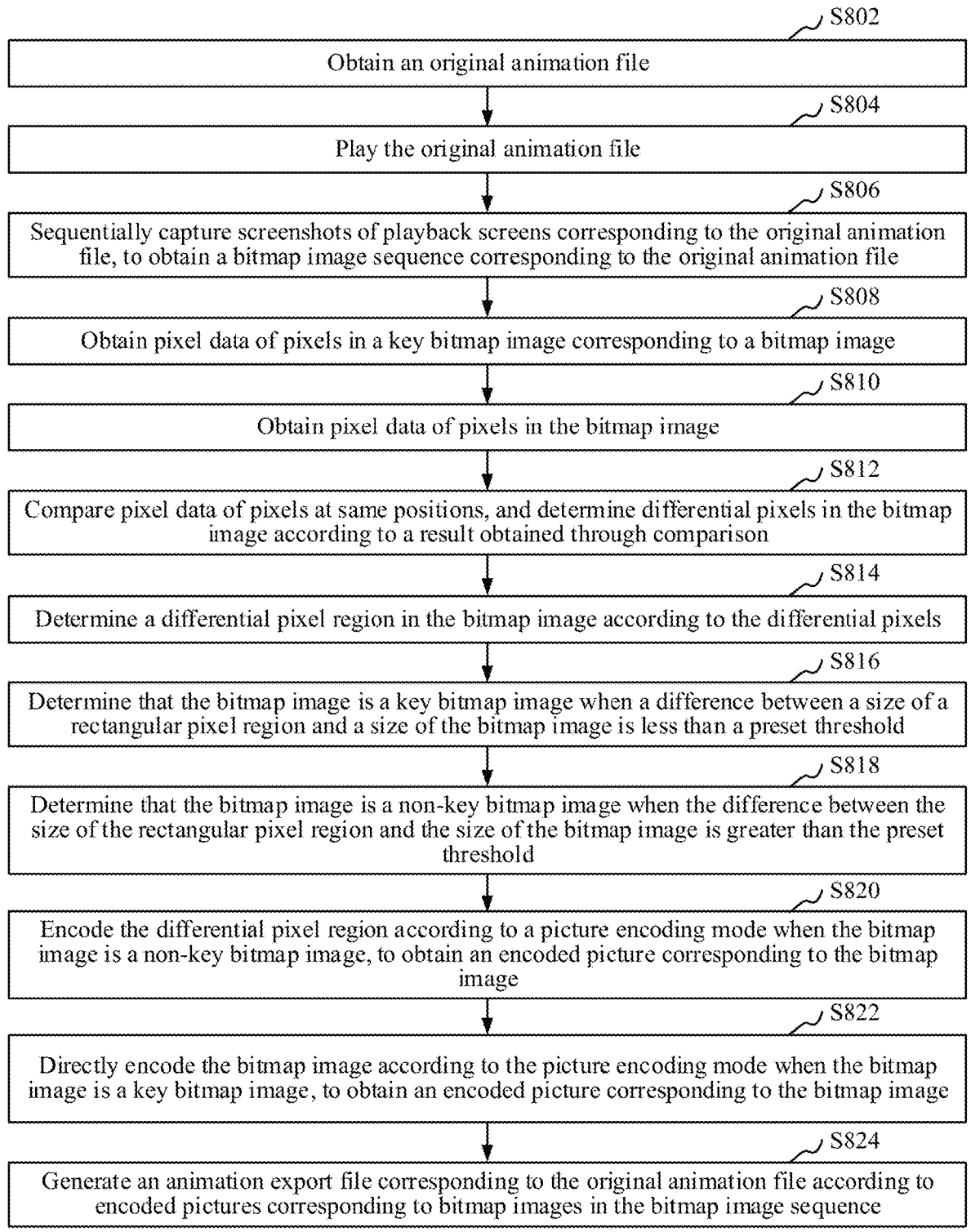
FIG. 8 is a schematic flowchart of processing an original animation file according to a bitmap sequence frame export mode to obtain an animation export file according to a specific embodiment.

As shown in FIG. 8, in a specific embodiment, the method of obtaining an animation export file by processing an original animation file according to a bitmap sequence frame export mode specifically includes the following steps:

S802. Obtain an original animation file.

S804. Play the original animation file.

S806. Sequentially capture screenshots of playback screens corresponding to the original animation file, to obtain the bitmap image sequence corresponding to the original animation file.

S808. Obtain pixel data of pixels in a key bitmap image corresponding to a bitmap image. In some embodiments, the key bitmap images in the bitmap image sequence may be assigned arbitrarily at first, such as bitmap images at intervals of a preset quantity of bitmap images starting from the first bitmap image (e.g., $1^{st}$ bitmap, $6^{th}$ bitmap, $11^{th}$ bitmap, etc.) The key bitmap image corresponding to a bitmap image is the key bitmap image that numbered closest to the bitmap image (e.g., when $1^{st}$ bitmap, $6^{th}$ bitmap, $11^{th}$ bitmap are key bitmaps, the key bitmap image corresponding to $2^{nd}$ bitmap is the $P^t$ bitmap, and the key bitmap image corresponding to the $8^{th}$ bitmap is the $6^{th}$ bitmap). In some embodiments, the first bitmap image is considered as a key bitmap image and the next key bitmap image may be determined according to following comparison result about differential pixels in the bitmap image. For example, when a bitmap image is quite different from the current key bitmap image (e.g., difference between a size of the differential pixel region and the size of the bitmap image is greater than the preset threshold), said bitmap image can be determined as the new key bitmap image corresponding to its subsequent bitmap images.

S810. Obtain pixel data of pixels in the bitmap image.

S812. Compare pixel data of pixels at same positions, and determine differential pixels in the bitmap image according to a result obtained through comparison.

S814. Determine a differential pixel region in the bitmap image according to the differential pixels.

S816. Determine that the bitmap image is a key bitmap image when a difference between a size of a rectangular pixel region and a size of the bitmap image is less than a preset threshold. In other words, when the current bitmap image is quite different from the corresponding key bitmap image, the rectangular pixel region would be relatively large, and the current bitmap image may be considered as another key bitmap image.

S818. Determine that the bitmap image is a non-key bitmap image when the difference between the size of the rectangular pixel region and the size of the bitmap image is greater than the preset threshold.

S820. Encode the differential pixel region according to a picture encoding mode when the bitmap image is a non-key bitmap image, to obtain an encoded picture corresponding to the bitmap image.

S822. Directly encode the bitmap image by using the picture encoding mode when the bitmap image is a key bitmap image, to obtain an encoded picture corresponding to the bitmap image.

S824. Generate an animation export file corresponding to the original animation file according to encoded pictures corresponding to bitmap images in the bitmap image sequence.

FIG. 8 is a schematic flowchart of an animation file processing method according to an embodiment. It is to be understood that, although each step of the flowcharts in FIG. 8 is displayed sequentially according to arrows, the steps are not necessarily performed according to an order indicated by arrows. Unless otherwise explicitly specified in the present disclosure, an order of execution of the steps is not strictly limited, and the steps may be performed in other orders. In addition, at least some steps in FIG. 8 may include a plurality of substeps or a plurality of stages. The substeps or the stages are not necessarily performed at a same moment, and instead may be performed at different moments. The substeps or the stages are not necessarily performed in sequence, but may be performed in turn or alternately with another step or at least some of substeps or stages of the another step.

Figure 9:
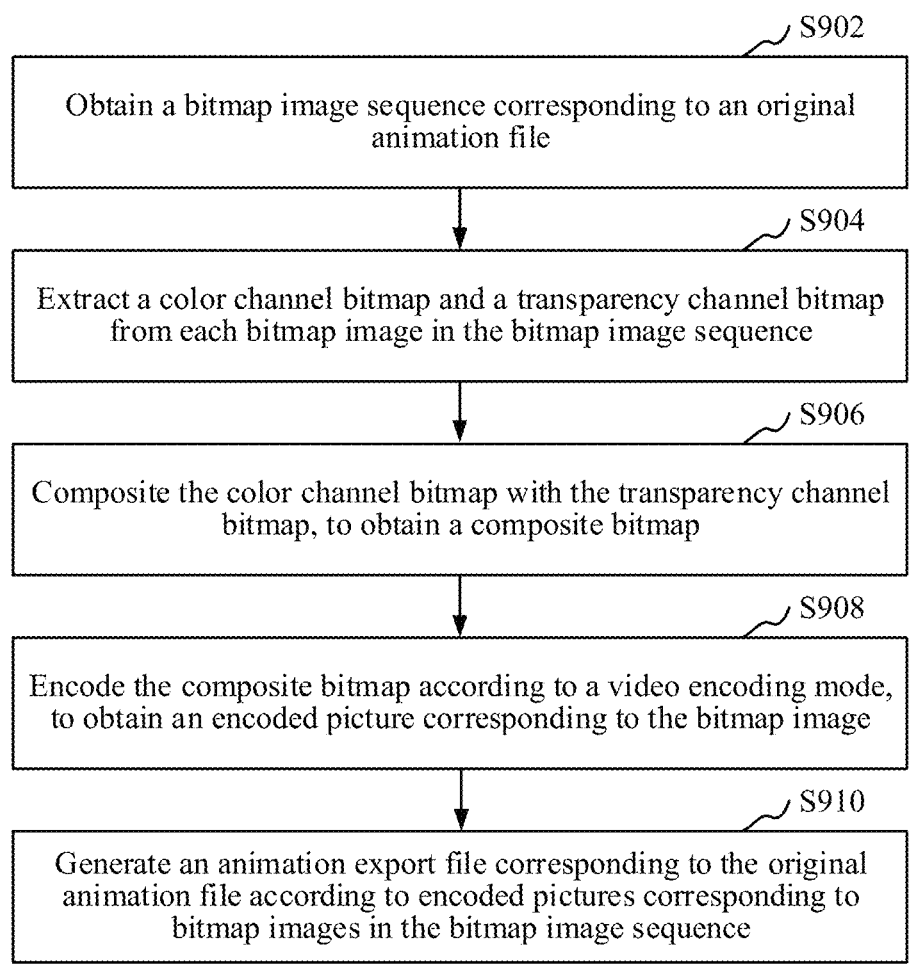
FIG. 9 is a schematic flowchart of an animation file processing method according to another embodiment.

As shown in FIG. 9, in an embodiment, an animation file processing method is provided. This embodiment is mainly described by using an example in which the method is applicable to the foregoing animation file export terminal 110 in FIG. 1. For ease of description, the terminal is directly used for description below. Referring to FIG. 9, the animation file processing method specifically includes the following steps:

S902. Obtain a bitmap image sequence corresponding to an original animation file.

The original animation file is an original animation project file. The animation project file includes animation vector data, which is data used for describing animation effects that can be presented in whole animation, for example, width, height, and position information, transparency, and rotation information of an animation layer. The original animation file may be, for example, a project file with the suffix .aep obtained through Adobe After (AE) software design, and may be obtained by using an AE SDK. The bitmap image, also referred to as a dot matrix image, is an image represented by a pixel array formed by sequentially and orderly arranging single pixels. The bitmap image is an image that has not been subject to compression encoding. The bitmap image sequence is a sequence formed by bitmap images corresponding to frames of animation in the original animation file. Processing is performed based on the original animation file, which, compared with implementing the animation file in a native code mode, can reduce development workload and lower costs.

In an embodiment, the step of obtaining a bitmap image sequence corresponding to an original animation file includes: obtaining the original animation file; playing the original animation file; and sequentially capturing screenshots of playback screens corresponding to the original animation file, to obtain the bitmap image sequence corresponding to the original animation file.

Specifically, the terminal may obtain the original animation file, and when playing the original animation file, capture screenshots of playback screens corresponding to the original animation file frame by frame into bitmap images, to obtain the corresponding bitmap image sequence.

In an embodiment, a screenshot of each frame of the original animation file may be captured by using a screenshot capturing function of the AE SDK, to obtain a bitmap image corresponding to the each frame, so as to obtain the bitmap image sequence corresponding to the whole original animation file.

S904. Extract a color channel bitmap and a transparency channel bitmap from each bitmap image in the bitmap image sequence.

To further reduce the size of the animation export file and also help improve the efficiency of subsequently decoding the animation export file by a client, compression encoding may be performed on the bitmap images in the bitmap image sequence according to the video encoding mode. However, generally, the animation has a transparent effect. That is, the bitmap images in the bitmap image sequence corresponding to the obtained original animation file have transparent channel data. However, video frames in a video sequence do not have the transparent effect and do not have transparent channel data. If the bitmap images in the bitmap image sequence need to be encoded according to the video encoding mode, the bitmap images need to be first converted into non-transparent images.

Specifically, for each bitmap image in the bitmap image sequence, the terminal may read pixel data of the each bitmap image pixel by pixel, separate color data and transparency data from the read pixel data, and obtain the corresponding color channel bitmap and transparency channel bitmap according to the separated data The each bitmap image in the bitmap image sequence is divided into the color channel bitmap and the transparency channel bitmap, that is, two bitmap images with the same size as the bitmap image obtained by splitting pixel data of the pixels in the bitmap image according to the color data and the transparency data.

In an embodiment, the step of extracting a color channel bitmap and a transparency channel bitmap from the bitmap image includes: obtaining pixel data of pixels in the bitmap image; and extracting color data and transparency data corresponding to the pixels from the pixel data; generating the color channel bitmap corresponding to the bitmap image according to the color data of the pixels; and generating the transparency channel bitmap corresponding to the bitmap image according to the transparency data of the pixels.

In the bitmap image, the pixel data of the pixels includes the color data and the transparency data. The color data is a value corresponding to RGB, and the transparency data is a value of Alpha. The value of Alpha represents transparency of a specific pixel, and a range of the Alpha value may be [0, 255]. Alternatively, the Alpha value may be represented by a value corresponding to a range of [0, 1] after [0, 255] is mapped to [0, 1]. That is, the Alpha value may be a value between 0 to 1, where 0 represents full transparency, and 1 represents full non-transparency.

For example, if pixel data at a point (x, y) is (RedValue, GreenValue, BlueValue, AlphaValue) in the bitmap image, the color data corresponding to the point (x, y) is (RedValue, GreenValue, BlueValue) in the color channel bitmap obtained through division, and the transparency data corresponding to the point (x, y) in the transparency channel bitmap is AlphaValue.

S906. Composite the color channel bitmap with the transparency channel bitmap, to obtain a composite bitmap.

Specifically, after extracting the color channel bitmap and the transparency channel bitmap from the bitmap image, the terminal may composite the color channel bitmap with the transparency channel bitmap, to obtain the composite bitmap corresponding to the bitmap image. Data of each pixel in the composite bitmap has no transparency.

In an embodiment, the compositing the color channel bitmap and the transparency channel bitmap may be placing the color channel bitmap and the transparency channel bitmap up and down, and a height of the obtained composite bitmap is twice that of the bitmap image. The compositing the color channel bitmap and the transparency channel bitmap may be placing the color channel bitmap and the transparency channel bitmap left and right, and a width of the obtained composite bitmap is twice that of the bitmap image.

Figure 10:
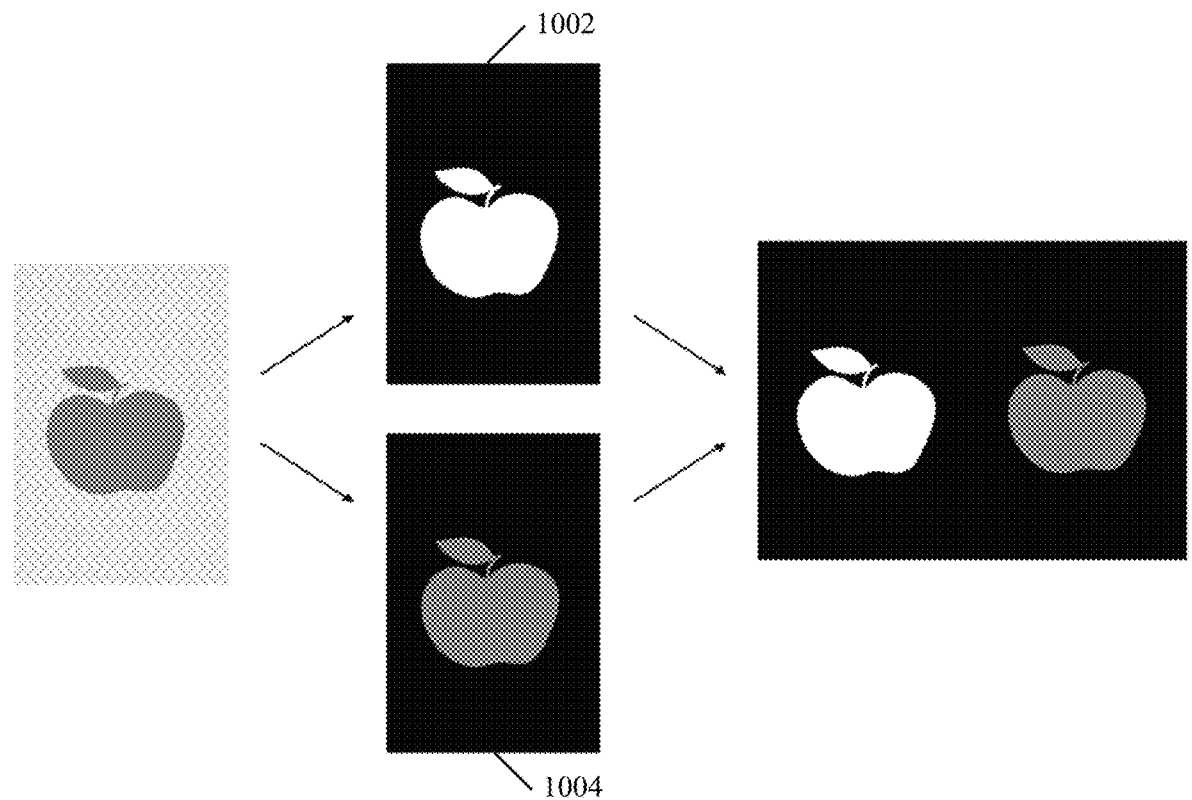
FIG. 10 is a schematic diagram of processing a bitmap image to obtain a composite bitmap according to an embodiment.

FIG. 10 is a schematic diagram of processing a bitmap image to obtain a composite bitmap according to an embodiment. Referring to FIG. 10, the left part is a bitmap image having transparency. There are a transparency channel bitmap 1002 and a color channel bitmap 1004 respectively in the middle part. In the transparency channel bitmap 1002, AlphaValue of each pixel in a black region is 0. That is, black represents full transparency. AlphaValue of each pixel in a white region is 1. That is, white represents full non-transparency. In the color channel bitmap 1004, color data of each pixel is data corresponding to a presented color. The right part is a composite bitmap obtained by placing the transparency channel bitmap 1002 and the color channel bitmap 1004 left and right.

S908. Encode the composite bitmap according to a video encoding mode, to obtain an encoded picture corresponding to the bitmap image.

Specifically, after the composite bitmaps corresponding to the bitmap images in the bitmap image sequence are obtained, compression encoding may be performed on the composite bitmaps according to the video encoding mode, to obtain the corresponding encoded pictures. Picture information of frames of encoded pictures is stored in the animation export file.

Certainly, in some special cases, if animation does not have a transparent effect, that is, each bitmap image in the bitmap image sequence corresponding to the original animation file does not have transparent channel data, the each bitmap image in the bitmap image sequence does not need to be divided into a color channel bitmap and a transparency channel bitmap, and the bitmap image may be directly encoded according to the video encoding mode, to obtain the corresponding encoded picture.

S910. Generate an animation export file corresponding to the original animation file according to encoded pictures corresponding to bitmap images in the bitmap image sequence.

Specifically, after the encoded pictures corresponding to the bitmap images are obtained, the animation export file in a target format may be generated according to encoded pictures corresponding to bitmap images. The animation export file exported actually stores the picture information of the encoded pictures corresponding to the bitmap images, that is, picture binary data. Certainly, the animation export file exported may further include information used for identifying an export mode of the animation export file, or may further include some basic animation attribute information, such as animation duration, a frame rate, and a background color.

When animation needs to be played, only the animation export file in the target format needs to be decoded, and pictures are sequentially displayed after pixel data of each frame of picture is obtained, so that the animation export file is played. Specifically, the animation export file is read to obtain picture binary data corresponding to each encoded picture, the picture binary data is then decoded according to a video decoding mode to restore a composite bitmap, a color channel bitmap and a transparency channel bitmap are extracted from the restored composite bitmap, a picture is rendered according to the color data of the pixels in the color channel bitmap, the rendered picture is masked according to the transparency data of the pixels in the transparency channel bitmap, to obtain video frames with transparency, and the animation can be played by displaying the video frames in sequence according to a sequence of the video frames.

In the foregoing animation file processing method, processing is performed based on the original animation file, which, compared with implementing the animation file in a native code mode, can reduce development workload and lower costs. In addition, the color channel bitmap and the transparency channel bitmap are extracted from each bitmap image, the color channel bitmap is then composited with the transparency channel bitmap, to obtain the composite bitmap, and the composite bitmap is then encoded according to the video encoding mode, to obtain the encoded picture corresponding to the bitmap image, so that the animation export file generated according to the encoded pictures has a smaller file size, and the animation export file can be decoded according to the video decoding mode, thereby achieving higher decoding efficiency.

Figure 11:
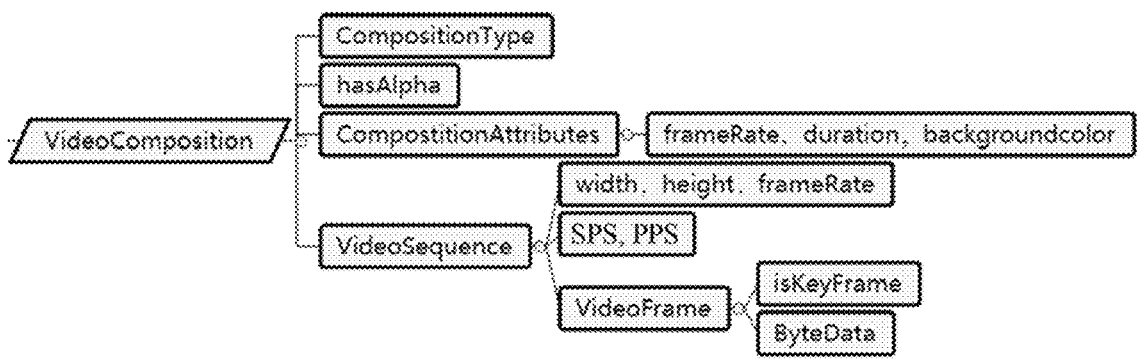
FIG. 11 is a schematic diagram of a data structure of an animation export file obtained by processing an original animation file according to a video sequence frame export mode according to an embodiment.

The animation export file obtained by using the foregoing animation file processing method is actually an animation file in the target format obtained according to a video sequence frame export mode. FIG. 11 is a schematic diagram of a data structure of an animation export file obtained by processing an original animation file according to a video sequence frame export mode according to an embodiment. The whole animation export file is actually formed by video frames, and therefore, picture information of the video frames is stored. The stored picture information, when being decoded, is used for display after the video frames are restored. The data structure shown in FIG. 11 defines a specific representation form of the animation export file obtained according to the video sequence frame export mode. After the animation export file is decoded, binary data is converted into an animation object and stored in an internal memory. The following information may be read from the animation object:

VideoComposition represents the whole animation export file, and includes CompositionType, hasAlpha, CompositionAttributes, and VideoSequence. CompositionType represents a composition type, that is, a mode in which the animation export file is exported, to help parse data according to a corresponding decoding mode. hasAlpha represents whether animation has a transparency channel. If so, a value of hasAlpha is 1; and if not, the value of hasAlpha is 0. CompositionAttributes represent composition attributes, that is, some basic attributes of the animation export file, and include: duration, framerate, and backgroundcolor, where duration represents duration occupied when the whole animation export file is played, framerate represents a frame rate at which the animation is played according to the animation export file, and backgroundcolor represents a background color of the animation.

VideoSequence represents a video frame sequence, that is, a sequence formed by the encoded pictures obtained by encoding the composite bitmaps according to the video frame sequence. VideoSequence specifically includes a pixel width, width, a pixel height, height, a frame rate, framerate, of a playback screen presented when a whole encoded picture is played after being decoded, and further includes information parameters SPS and PPS that need to be transferred to a video decoder. The information parameters are used for initializing the video decoder. VideoSequence further includes an array, VideoFrame, formed by the picture information of the encoded pictures corresponding to the bitmap images, and each element in the array includes an isKeyFrame field and ByteData. isKeyFrame represents whether an encoded picture is a key frame, and ByteData represents binary data corresponding to the encoded picture.

Figure 12:
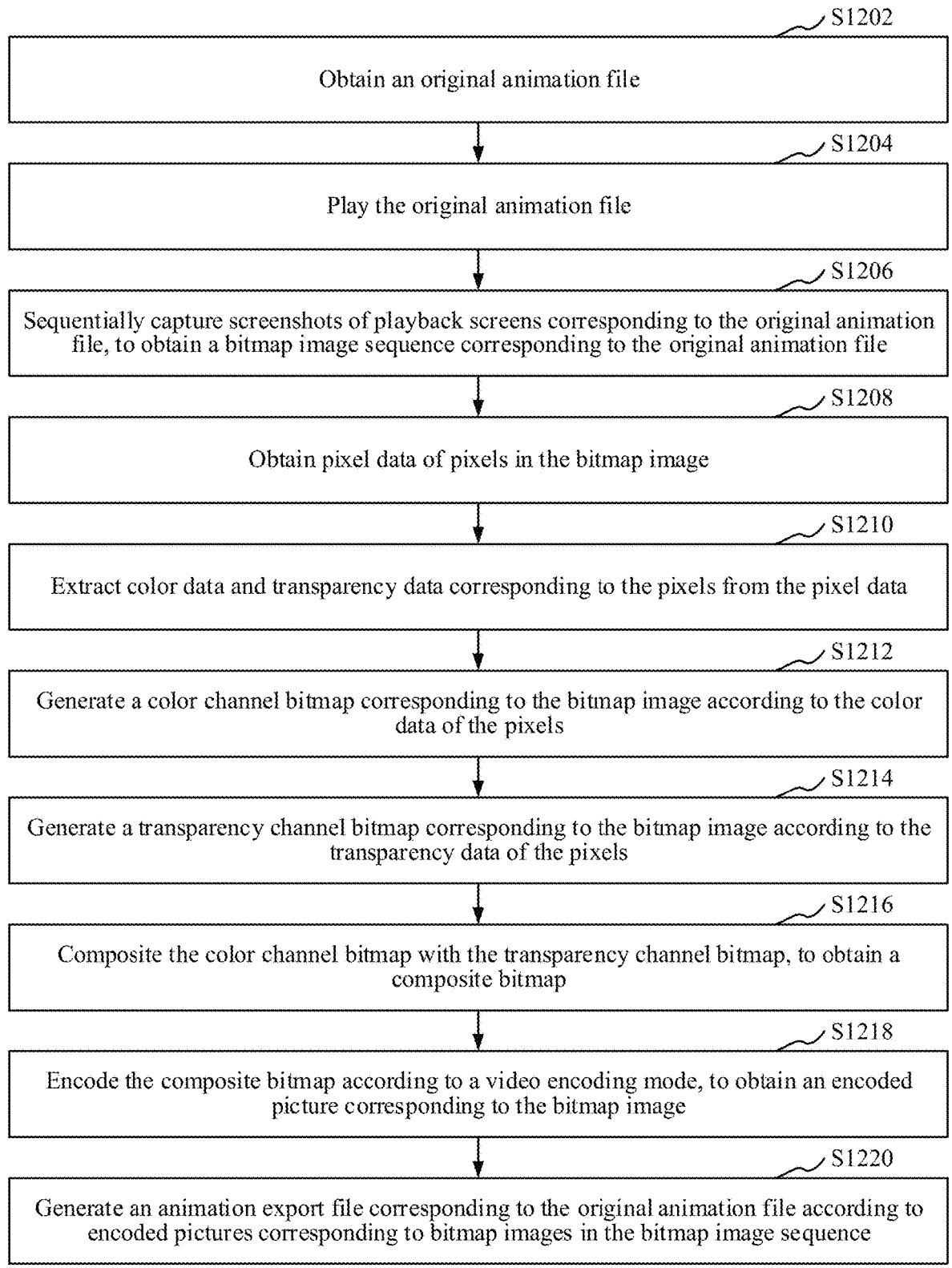
FIG. 12 is a schematic flowchart of processing an original animation file according to a video sequence frame export mode to obtain an animation export file according to a specific embodiment.

FIG. 12 is a schematic flowchart of exporting an animation export file according to a video sequence frame mode according to a specific embodiment. Referring to FIG. 12, the method specifically includes the following steps:

S1202. Obtain an original animation file.
S1204. Play the original animation file.
S1206. Sequentially capture screenshots of playback screens corresponding to the original animation file, to obtain the bitmap image sequence corresponding to the original animation file.
S1208. Obtain pixel data of pixels in the bitmap image.
S1210. Extract color data and transparency data corresponding to the pixels from the pixel data.
S1212. Generate a color channel bitmap corresponding to the bitmap image according to the color data of the pixels.
S1214. Generate a transparency channel bitmap corresponding to the bitmap image according to the transparency data of the pixels.
S1216. Composite the color channel bitmap with the transparency channel bitmap, to obtain a composite bitmap.
S1218. Encode the composite bitmap according to a video encoding mode, to obtain an encoded picture corresponding to the bitmap image.
S1220. Generate an animation export file corresponding to the original animation file according to encoded pictures corresponding to bitmap images in the bitmap image sequence.

In an embodiment, the foregoing animation file processing method may be installed on a terminal in a form of an animation file export plug-in. The terminal may perform the animation file processing method by using the plug-in, that is, process animation effect data of the read original animation file according to one of a vector export mode, a bitmap sequence frame export mode, and a video frame export mode, to obtain the corresponding animation export file.

Figure 13:
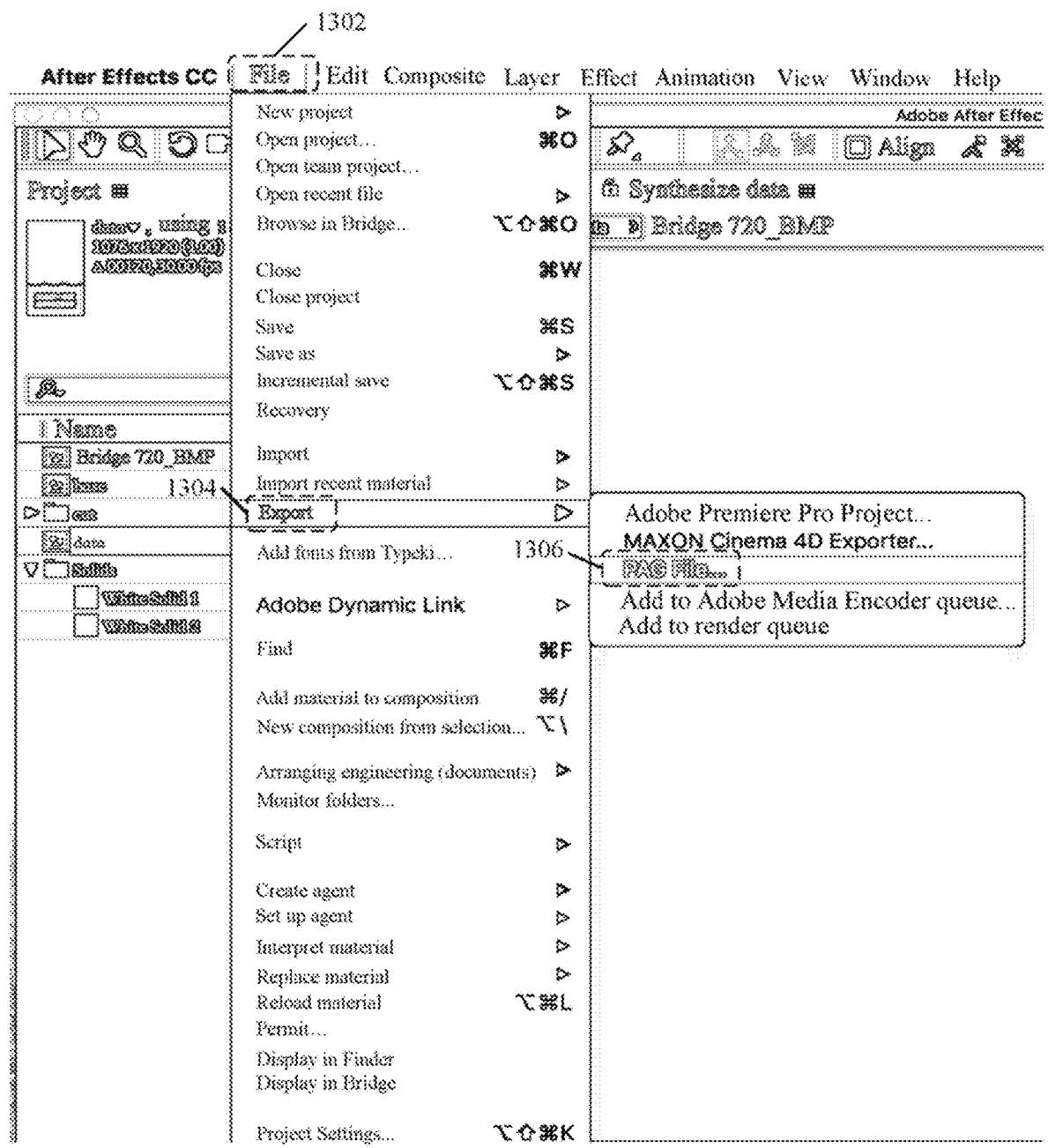
FIG. 13 is a schematic interface diagram of exporting a PAG file according to a vector export mode according to an embodiment.

FIG. 13 is a schematic interface diagram of exporting a PAG file according to a vector export mode according to an embodiment. After a PAGExporter plug-in is installed, in AE software, an original animation file that needs to be exported is selected. "File" (the "File" is an option named "File") numbered 1302 in a menu is clicked or tapped, and in this case, a drop-down box pops up. Then, "Export" numbered 1304 in the pull-down box is clicked or tapped, and in this case, another pull-down box pops up. Next, "PAGfile" numbered 1306 in the drop-down box is clicked or tapped. That is, "File"→"Export"→"PAGfile" are sequentially clicked or tapped. Finally, an animation export file in a PAG format can be exported after a save path is selected.

Figure 14A:
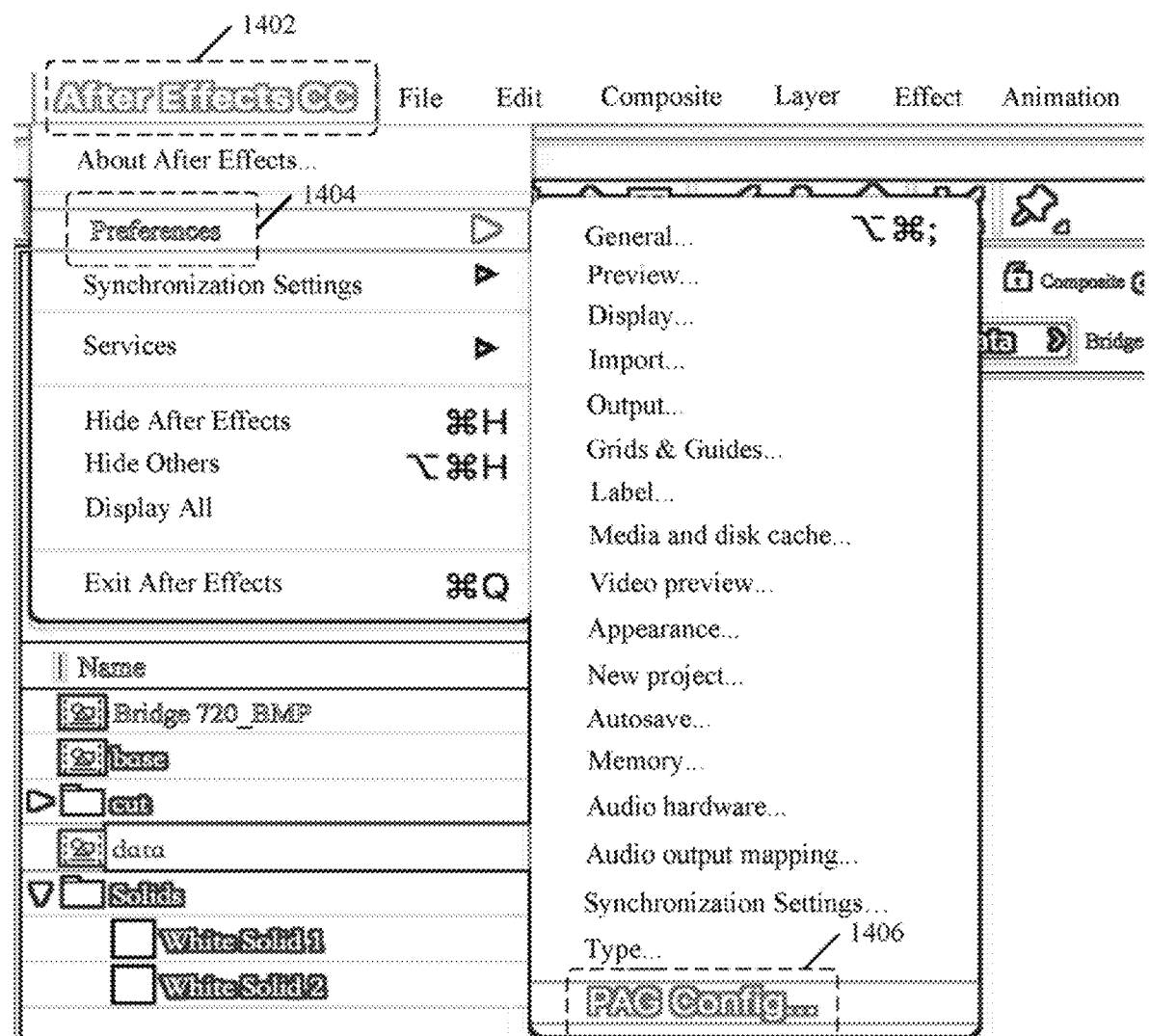
FIG. 14A is a schematic interface diagram of exporting a PAG file according to a sequence frame export mode according to an embodiment.

FIG. 14A is a schematic interface diagram of exporting a PAG file according to a sequence frame export mode according to an embodiment. After a PAGExporter plug-in is installed, in AE software, an original animation file that needs to be exported is selected. "After Effects CC" numbered 1402 in a menu is clicked or tapped, and in this case, a drop-down box pops up. Then, "Preferences" numbered 1404 in the pull-down box is clicked or tapped, and in this case, another pull-down box pops up. "PAG Config . . . " numbered 1406 in the drop-down box is clicked or tapped. That is, "After Effects CC"→"Preferences"→"PAG Config . . . " are sequentially clicked or tapped. In this case, as shown in FIG. 14B, a configuration interface pops up. Export parameters may be set in the configuration interface. The export parameters are classified into a general export parameter 1410 and a sequence frame export parameter 1412. The general export parameter 1410 includes Image compression quality (which may be set to 0 to 100), a TAG level, and Export version control. The TAG level refers to a level of an SDK version supported by the animation export file. When a button of the general export parameter 1410 is clicked or tapped, Image compression quality, TAG level, and Export version control are displayed on the configuration interface, and then, the parameters are set. In addition, the sequence frame export parameter 1420 includes Export size upper limit, Key frame interval, Scale ratio, Frame rate, and the like. When a button of the sequence frame export parameter 1420 is clicked or tapped, Export size upper limit, Key frame interval, Scale ratio, and Frame rate are displayed on the configuration interface, and then, the parameters are set. After the export parameters are set, "OK" is clicked or tapped, a suffix of the export file is modified to "_bmp" or "_BMP" after a save path is selected to obtain the PAG file exported according to a bitmap sequence frame export mode. If the suffix of the export file is modified to "_video" or "_VIDEO", the PAG file exported according to a video sequence frame export mode is obtained.

Figure 15:
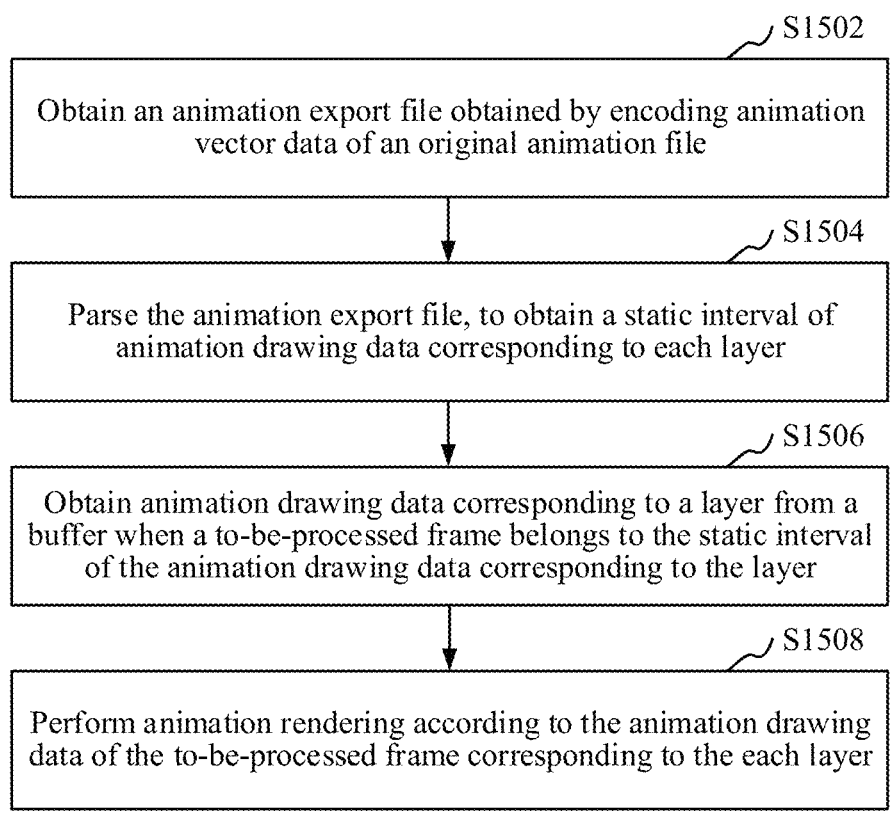
FIG. 15 is a schematic flowchart of an animation file processing method according to still another embodiment.

As shown in FIG. 15, in an embodiment, an animation file processing method is provided. This embodiment is mainly described by using an example in which the method is applicable to the foregoing animation file export terminal 110 in FIG. 1. For ease of description, the terminal is directly used for description below. Referring to FIG. 15, the animation file processing method specifically includes the following steps:

S1502. Obtain an animation export file obtained by encoding animation vector data of an original animation file.

The original animation file is an original animation project file. The animation project file includes animation vector data, which is data used for describing animation effects that can be presented in whole animation. The animation is implemented by using a plurality of layers. The animation vector data specifically includes animation layer data of the animation layers, and further includes animation basic-attribute data of a whole original animation file. After obtaining the original animation file, the terminal may read the animation vector data corresponding to the layers from the original animation file, and then store the animation vector data according to the data structure in the target format, where the data included in the obtained animation export file is in a one-to-one correspondence with the layer structure of the original animation file. This process is restoring the animation layer structure. The animation export file herein obtained by encoding the animation vector data is actually the animation file in the target format obtained according to a vector export mode.

S1504. Parse the animation export file, to obtain a static range of animation drawing data corresponding to each layer.

The animation playback process includes decoding, rendering and presenting. The decoding further includes physical file decoding and data parsing. The physical file decoding refers to a process of obtaining a binary sequence after decoding an original animation export file and loading the binary sequence into an internal memory in a form of an animation object. The animation object includes all animation attribute data of the animation export file. The data parsing refers to a process of reading the animation object from the internal memory and obtaining animation drawing data of a current animation frame through parsing according to the animation object when a specific animation frame needs to be played. The rendering refers to a process of calculating rendering data of the animation frame according to the animation drawing data corresponding to the animation frame. The presenting refers to a process of transmitting the rendering data of the animation frame to a display to trigger the display to display the animation frame. Therefore, the animation drawing data herein is data used for describing the animation frame, for example, path information used for describing a specific shape. Because the animation export file is obtained by encoding the animation vector data of the original animation file, the animation export file herein is used for describing a whole animation effect by using a layer as a unit. That is, one layer may correspond to one animation frame, or may correspond to a plurality of animation frames. In this case, the plurality of animation frames all need to be rendered according to animation drawing data corresponding to the layer.

When one layer corresponds to a plurality of animation frames, the plurality of animation frames form a static range of the animation drawing data corresponding to the layer. That is, the plurality of animation frames all require the animation drawing data corresponding to the layer when being played. The static range is actually a frame interval formed by a plurality of consecutive animation frames. For example, a static range of animation drawing data corresponding to a specific layer is [m, n], which means that the $m^{th}$ frame to the $n^{th}$ frame of an animation export file all need to be rendered according to animation drawing data corresponding to the layer when being drawn, and an attribute value corresponding to the layer does not change. The static range of the animation drawing data of the whole animation export file may be understood as an intersection of the static ranges of all included layers.

Each layer may be formed by animation attribute groups of smaller particles. There are six classes of animation attribute groups in total, including: transform, mask indicating an intra-layer mask, trackMatter indicating an inter-layer mask, layerStyle, effect, and content. Therefore, the static range of the animation drawing data corresponding to the layer refers to an intersection of static ranges of all the animation attribute groups included in a specific layer.

For example, the animation export file is parsed. A specific Solidlayer layer in the animation export file includes three classes of animation attribute groups: transform, a mask, and content. If no attribute value in the animation attribute group transform of the layer changes in a plurality of consecutive animation frames [t1, t2], the plurality of consecutive animation frames [t1, t2] form a static range of the animation attribute group transform. If no attribute value in the animation attribute group mask of the layer changes in a plurality of consecutive animation frames [m1, m2], the plurality of consecutive animation frames [m1, m2] form a static range of the animation attribute group mask. Similarly, if a plurality of consecutive animation frames [c1, c2] form a static range of the animation attribute group Textlayer, an intersection among [t1, t2], [m1, m2] and [c1, c2] is the static range corresponding to the Solidlayer layer.

Because each animation attribute group is formed by animation attribute values of smaller particles, the static range of the animation attribute group refers to a frame interval of a plurality of consecutive animation frames when all the animation attribute values included in the animation attribute group do not change in the plurality of consecutive animation frames. That is, the animation attribute value is of a Hold type. The animation attribute in the animation attribute group is also referred to as a time axis attribute, that is, an attribute of which an attribute value is related to a playback progress. The attribute value may be increased or decreased as the playback progress changes, or may be shown as a Bezier curve along with the playback progress, or may be of the Hold type, that is, do not change within a specific period of playback time.

For example, animation attributes included in the animation attribute group transform include: anchorpoint (an anchor point position), scale (a scale attribute), rotation (a rotation attribute), and opacity (an opacity attribute). If no animation attribute value corresponding to the plurality of consecutive screens [t1, t2] in four animation attributes changes, the static range corresponding to the animation attribute group transform is [t1, t2].

In an embodiment, before playing the animation, the terminal may parse the animation export file, first find an interval section in which animation attribute values included in the layers do not change, determine static ranges of the animation attribute groups included in the layers, then find an intersection of the static ranges of all the animation attribute groups, to obtain static ranges of the layers, and then find an intersection of the static ranges of all the layers, to obtain a static range of the whole animation.

S1506. Obtain animation drawing data corresponding to a layer from a buffer when a to-be-processed frame belongs to the static range of the animation drawing data corresponding to the layer.

Because the animation drawing data corresponding to the animation frames in the static range does not change, the terminal may parse the animation export file to obtain animation drawing data of a starting frame in the static range, and buffer the animation drawing data of the starting frame, so as to render and display other animation frames in the static range according to the buffered animation drawing data of the starting frame when rendering and displaying animation frames.

Further, because the static range may be divided into the static range corresponding to the animation drawing data of the layer (Layer) and a static range corresponding to the animation drawing data of the animation attribute group (group), the terminal may buffer animation drawing data of layers corresponding to the starting frames in the static ranges corresponding to the layers, and may further buffer animation drawing data of an animation attribute group corresponding to the starting frame in the static range corresponding to the animation attribute group.

Specifically, the to-be-processed frame is an animation frame to be rendered and displayed currently. The terminal may calculate a currently-to-be-played animation frame according to the current playback progress. When the to-be-processed frame belongs to a static range of animation drawing data of a specific layer, buffered animation drawing data of the layer corresponding to a starting frame in the static range may be obtained. Initial animation drawing data corresponding to the to-be-processed frame is directly obtained from the buffer, to avoid a large amount of calculation, and reduce time consumption during rendering, so that the animation is played more smoothly.

In an embodiment, the foregoing animation file processing method further includes: obtaining, when the to-be-processed frame does not belong to the static range of the animation drawing data corresponding to the layer, or the animation drawing data corresponding to the layer does not have a static range, an animation object obtained by parsing the animation export file; and reading the animation object to obtain the animation drawing data corresponding to the layer.

Further, the terminal may read, when the to-be-processed frame does not belong to a static range of animation drawing data of a specific layer, or none of the layers has a static range, the animation object obtained by parsing the animation export file, and obtain animation drawing data of each layer corresponding to the to-be-processed frame through parsing according to the animation object.

Certainly, the terminal may alternatively traverse the static ranges of the animation attribute groups included in the layer, and obtain, when the to-be-processed frame belongs to a traversed static range corresponding to a specific animation attribute group of the layer, buffered animation drawing data of the animation attribute group corresponding to a starting frame in the static range. The terminal needs to obtain, when the to-be-processed frame does not belong to a static range corresponding to any animation attribute group, or none of the animation attribute groups has a corresponding static range, the animation drawing data of the to-be-processed frame by parsing the animation object.

S1508. Perform animation rendering according to the animation drawing data of the to-be-processed frame corresponding to the each layer.

Specifically, the animation rendering refers to calculating corresponding rendering data according to the animation drawing data. The rendering data may trigger a display screen to display a visible animation picture. The terminal may calculate the rendering data of the each layer corresponding to the to-be-processed frame according to the animation drawing data of the to-be-processed frame corresponding to the each layer, and perform presentation and display after combining the rendering data of the each layer.

In an embodiment, the foregoing animation file processing method further includes:

obtaining a current rendering progress; calculating a frame number of the to-be-processed frame according to the rendering progress and a total frame number and total duration that correspond to the animation export file; traversing the static range of the animation drawing data corresponding to the each layer; and determining that the to-be-processed frame belongs to the static range of the animation drawing data corresponding to the layer when the frame number is found in the static range.

Specifically, to-be-screened rendering data is stored in a frame buffer, the rendering data stored in the frame buffer continuously changes, and a logic circuit of a screen of the terminal periodically refreshes, by using the rendering data in the frame buffer, a screen presented by all pixels on the screen. This period is generally 60 Hz. That is, a refresh frequency of the logic circuit is 60 times per second, which is roughly one refresh in 16.7 ms. Therefore, if the rendering data in the frame buffer does not change within a specific period of time, the screen presented by the terminal does not change, and only when the rendering data in the frame buffer is continuously updated, the animation screens can be played frame by frame.

After starting rendering, the terminal may start logic of periodically refreshing the screen, to periodically obtain the rendering data from the frame buffer for presentation and display. In addition, the terminal may obtain a timestamp of a current refresh and a timestamp of the first fresh, and calculate a current rendering progress according to a time difference between the timestamps of the two refreshes. For example, if the timestamp of the first refresh is at 10 ms, a timestamp of the second refresh is at 10+16.7=26.7 ms. In this case, the rendering progress is 16.7 ms. A timestamp of the $10^{th}$ refresh is at 177 ms, and the rendering progress is 167 ms.

The total frame number of the animation export file is the total number of animation frames included in the whole animation export file. The total frame number may be obtained by directly parsing the animation export file, or may be calculated according to a frame rate (framerate) and total duration (duration) obtained by parsing the animation export file. The terminal may calculate the frame number of the to-be-processed frame according to the following formula:

frame number=rendering progress*total frame number/total duration. The frame number of the to-be-processed frame is obtained after rounding.

Because the frame rate of the animation and a frequency at which the terminal screen refreshes may be different, and a period at which the terminal screen refreshes is relatively short, there may be a case that content of a same frame is rendered in several refresh periods. That is, the to-be-processed frame is the same as the animation frame that has been rendered and displayed currently. In this case, the to-be-processed frame is directly returned without being presented and displayed repeatedly.

Specifically, after calculating the static range corresponding to the animation drawing data of the each layer, the terminal may traverse the static range of the each layer. When the frame number of the to-be-processed frame is found in a static range of a specific layer, the to-be-processed frame belongs to the static range of the animation drawing data of the layer.

Figure 16:
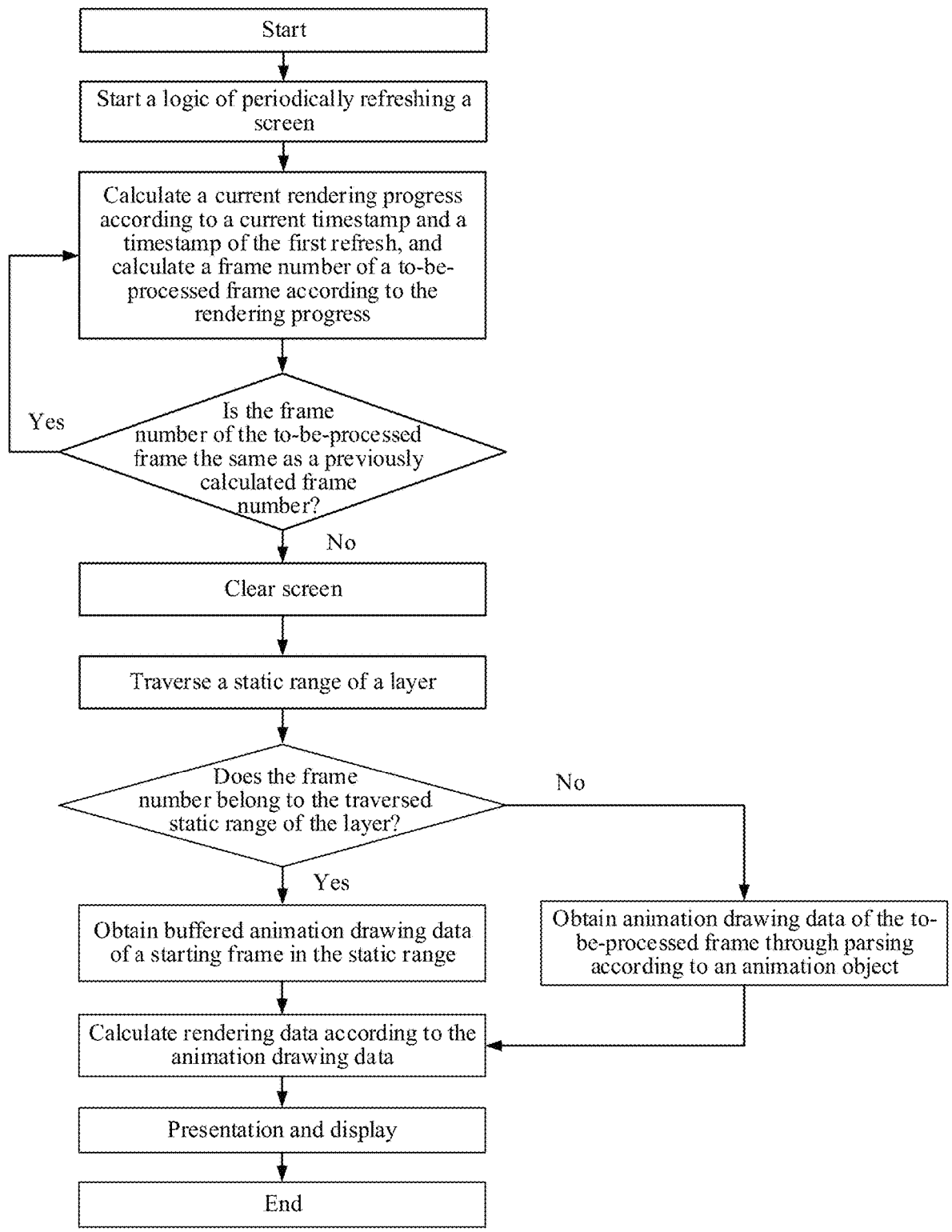
FIG. 16 is a schematic flowchart of performing animation rendering on an animation export file exported according to a vector export mode according to an embodiment.

FIG. 16 is a schematic flowchart of performing animation rendering on an animation export file exported according to a vector export mode according to an embodiment. When playback of the animation export file is started, logic of periodically refreshing the screen is started first. That is, rendering data is obtained from a frame buffer at intervals of a specific period for presentation and display. After a current refresh, a current rendering progress is calculated according to a current timestamp and a timestamp of the first refresh. If a frame number of a to-be-processed frame calculated according to the rendering progress is the same as a previously calculated frame number, the rendering data does not need to be repeatedly calculated and presented. If the calculated frame number of the to-be-processed frame is different from the previous frame number, screen clearing processing needs to be performed, and after the screen clearing processing, a static range of animation drawing data corresponding to each layer is traversed according to the calculated frame number. If the frame number belongs to the traversed static range of the animation drawing data corresponding to the layer, animation drawing data of a starting frame in the static range is obtained from a buffer, and rendering data of the to-be-processed frame is calculated according to the animation drawing data. If the frame number does not belong to a static range of animation drawing data corresponding to a specific layer, animation drawing data of the to-be-processed frame need to be obtained through parsing according to an animation object, and the rendering data is then calculated. Finally, if content in the frame buffer is rewritten with the rendering data of the to-be-processed frame, presentation and display may be performed according to the rendering data of the to-be-processed frame when a next refresh time arrives, so as to display a playback screen of the to-be-processed frame.

In the foregoing animation file processing method, the static range of the animation drawing data corresponding to the layer refers to a frame sequence formed by a plurality of consecutive animation frames with unchanged layer attributes corresponding to a specific layer in the animation frames corresponding to the animation export file. When the to-be-processed frame needs to be displayed, the static range of the animation drawing data corresponding to the each layer needs to be traversed. When the to-be-processed frame belongs to the static range of the animation drawing data corresponding to the layer, the animation drawing data corresponding to the layer is directly obtained from the buffer, so that the buffer can be fully utilized to reduce the repeated calculation of the animation drawing data, and the animation rendering efficiency can be greatly improved.

Although the steps in the flowcharts of FIG. 3, FIG. 8, FIG. 9, FIG. 12, FIG. 15, and FIG. 16 are displayed in sequence based on indication of arrows, the steps are not necessarily performed in sequence based on the sequence indicated by the arrows. Unless otherwise explicitly specified in the present disclosure, an order of execution of the steps is not strictly limited, and the steps may be performed in other orders. In addition, at least some steps in FIG. 3, FIG. 8, FIG. 9, FIG. 12, FIG. 15, and FIG. 16 may include a plurality of substeps or a plurality of stages. The substeps or the stages are not necessarily performed at a same moment, and instead may be performed at different moments. The substeps or the stages are not necessarily performed in sequence, but may be performed in turn or alternately with another step or at least some of substeps or stages of the another step.

Figure 17:
FIG. 17 is a schematic diagram of an interface of an animation previewer according to an embodiment.

The present disclosure further provides an animation previewer. FIG. 17 is a schematic interface diagram of an animation previewer. The animation previewer may be the animation previewer PAGViewer run on the animation file preview terminal 120 in FIG. 2. The animation file preview terminal may preview and play an animation export file (a PAG file) by using the animation previewer, and may implement full preview and frame-by-frame preview of the animation export file. By previewing the animation export file, a designer can conveniently determine whether each frame of screen in the animation export file differs from that in an original animation file (an animation project file). In addition, performance parameters of the animation export file, including a time consumption parameter and the like, may be calculated by using the animation previewer, so that the rendering performance of the animation export file at a client can be quantitatively evaluated, to help the designer adjust and optimize the original animation file.

After the animation previewer is installed on the animation file preview terminal, the preview may be performed by double-clicking or tapping the animation export file as shown in FIG. 17, and content displayed in an animation display region 1702 in FIG. 17 is a preview screen of an animation export file of "Huge crowds of people.pag".

Hot keys and functions supported by the PAGViewer are as follows:

A space key is used for controlling playback and pause of the PAG file.

A B key is used for switching a background color when the PAG file is played and supports switching between a transparent background and a color background.

A left key is used for advancing one frame in a playback direction during frame-by-frame preview.

A right key is used for reversing one frame in a playback direction during frame-by-frame preview.

An S key is used for capturing a screenshot of a current frame of the PAG file, exporting the current frame as a picture, and storing the picture in a sibling path of the currently played PAG file.

Figure 18:
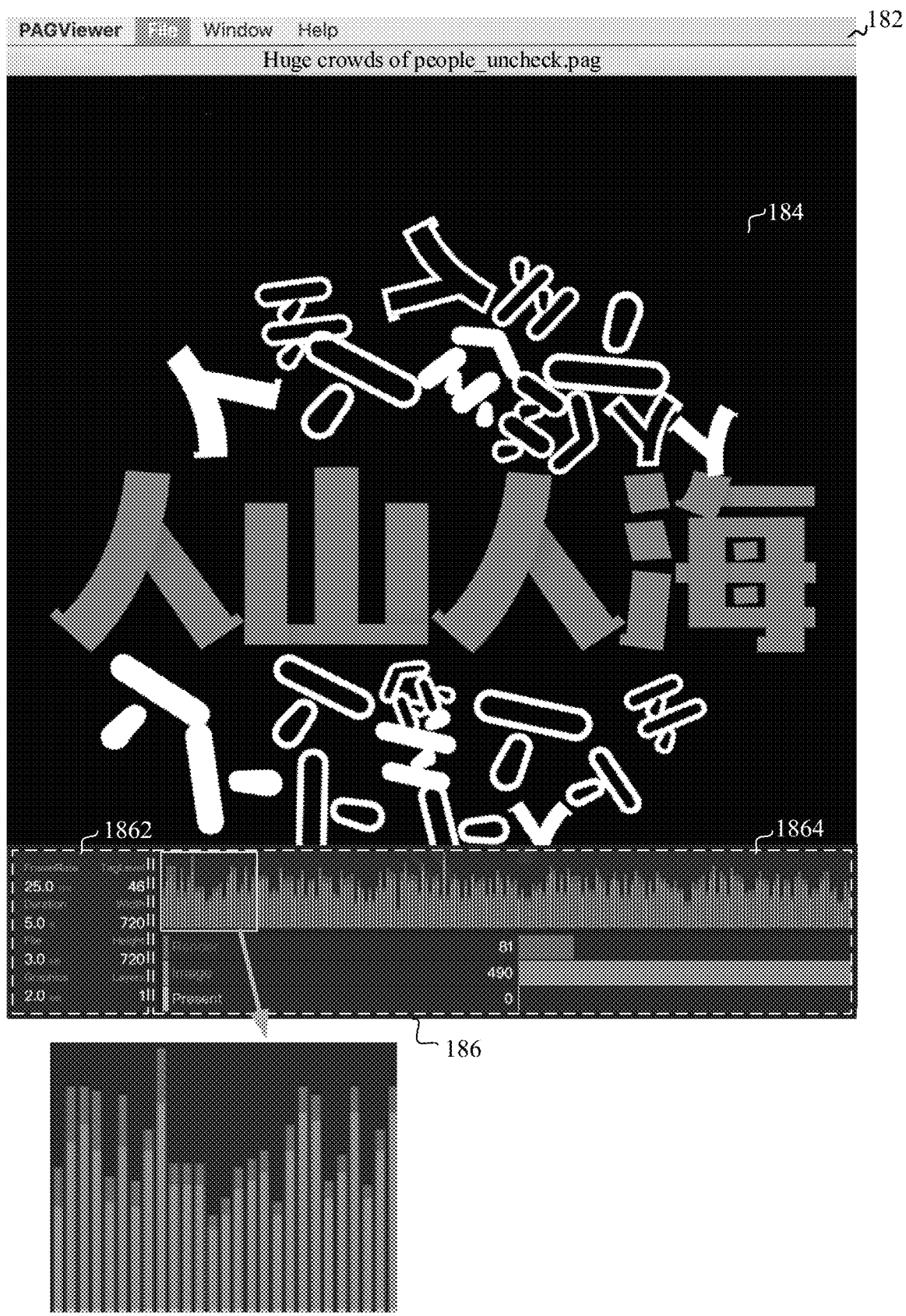
FIG. 18 is a schematic diagram of an interface of an animation previewer according to another embodiment.

A P key is used for calling up or hiding an animation monitoring panel, where the animation monitoring panel is shown in FIG. 18. After the PAG file is opened by using the animation previewer, the animation previewer includes a menu region 182, an animation display region 184, and an animation monitoring panel 186. The animation monitoring panel 186 includes an animation file description region 1862. The animation file description region may be used for displaying a frame rate (FrameRate) of an animation file, total duration of the animation (duration), a size of a memory occupied by the animation file (File), a size of a video memory occupied by the animation file (Graphics), a layer number of the animation file (Layer), a highest value of a tag in the animation file (TagLevel), a width of an animation frame (Width), a height of the animation frame (Height), and the like. The animation monitoring panel 186 further includes an animation frame description region 1864. The animation frame description region 1864 is used for displaying picture decoding time consumption or screenshot decoding time consumption of each animation frame in the animation file, and is further used for displaying rendering time consumption and presentation time consumption of the each animation frame. The animation frame description region 1864 further includes a histogram used for describing total time consumption (average decoding time consumption Image+rendering time consumption Render+presentation time consumption Present) of the each animation frame, and a proportion of each type of time consumption may be distinguished according to colors.

The animation export file exported according to a bitmap sequence frame export mode is actually formed by frames of pictures. Therefore, there is no corresponding buffer logic, and when the animation export file is played, each frame of picture needs to be decoded to obtain rendering data, and then drawing is performed. Specifically, during decoding, for an encoded picture corresponding to a key bitmap image, the whole encoded picture needs to be decoded, but for an encoded picture corresponding to a non-key bitmap image, only a differential pixel region is decoded according to position information and width and height information of the differential pixel region, to obtain rendering data of the differential pixel region.

The animation export file exported according to a video sequence frame export mode is also actually formed by the frames of pictures. A drawing mode is similar to that of the animation file obtained through bitmap sequence frame export.

Figure 19:
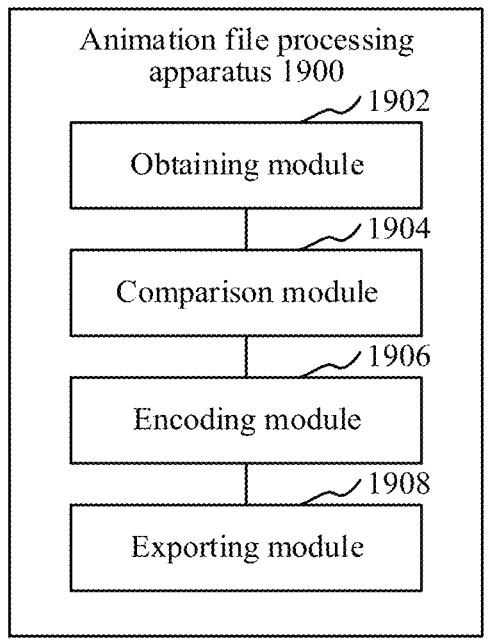
FIG. 19 is a structural block diagram of an animation file processing apparatus according to an embodiment.

In an embodiment, as shown in FIG. 19, an animation file processing apparatus 1900 is provided. The apparatus includes an obtaining module 1902, a comparison module 1904, an encoding module 1906, and an exporting module 1908.

The obtaining module 1902 is configured to obtain a bitmap image sequence corresponding to an original animation file.

The comparison module 1904 is configured to perform pixel comparison between the bitmap image in the bitmap image sequence and the corresponding key bitmap image, to obtain a differential pixel region in the bitmap image.

The encoding module 1906 is configured to encode the differential pixel region according to a picture encoding mode when the bitmap image is a non-key bitmap image, to obtain an encoded picture corresponding to the bitmap image.

The exporting module 1908 is configured to generate an animation export file corresponding to the original animation file according to encoded pictures corresponding to bitmap images in the bitmap image sequence.

In an embodiment, the encoding module 1906 is further configured to directly encode the bitmap image according to a picture encoding mode when the bitmap image is a key bitmap image, to obtain an encoded picture corresponding to the bitmap image.

In an embodiment, the obtaining module 1902 is further configured to: obtain the original animation file; play the original animation file; and sequentially capture screenshots of playback screens corresponding to the original animation file, to obtain the bitmap image sequence corresponding to the original animation file.

In an embodiment, the comparison module 1904 is further configured to: perform pixel comparison between the bitmap image in the bitmap image sequence and the corresponding key bitmap image, to obtain differential pixels in the bitmap image; and determine the differential pixel region in the bitmap image according to the differential pixels.

In an embodiment, the comparison module 1904 further includes a differential pixel determining unit. The differential pixel determining unit is configured to: obtain pixel data of pixels in the key bitmap image corresponding to the bitmap image; obtain pixel data of pixels in the bitmap image; and compare pixel data of pixels at same positions, and determining the differential pixels in the bitmap image.

In an embodiment, the differential pixel region is a rectangular pixel region. The animation file processing apparatus 1900 further includes a key bitmap image determining module, configured to: determine that the bitmap image is a key bitmap image when a difference between a size of a rectangular pixel region and a size of the bitmap image is less than a preset threshold; and determine that the bitmap image is a non-key bitmap image when the difference between the size of the rectangular pixel region and the size of the bitmap image is greater than the preset threshold.

In an embodiment, the animation file processing apparatus 1900 further includes a key bitmap image determining module, configured to: select the first bitmap image in the bitmap image sequence as the key bitmap image; and use a bitmap image at intervals of a preset quantity of bitmap images as a key bitmap image in the bitmap image sequence by using the first bitmap image as a starting image.

In an embodiment, the differential pixel region is a rectangular pixel region. The exporting module 1908 is further configured to: determine a pixel width and a pixel height that correspond to the rectangular pixel region and coordinates of a starting pixel in the rectangular pixel region; and store the pixel width, the pixel height, and the coordinates of the starting pixel into picture information corresponding to the encoded picture.

In an embodiment, the animation file processing apparatus 1900 further includes a division module and a compositing module. The division module is configured to extract a color channel bitmap and a transparency channel bitmap from the bitmap image. The compositing module is configured to composite the color channel bitmap with the transparency channel bitmap, to obtain a composite bitmap. The encoding module is further configured to encode the composite bitmap according to a video encoding mode, to obtain an encoded picture corresponding to the bitmap image.

In an embodiment, the animation file processing apparatus 1900 further includes an animation vector data obtaining module, configured to: obtain animation vector data of the original animation file, the animation vector data including animation basic-attribute data and animation layer data. The encoding module is further configured to store the animation basic-attribute data and the animation layer data according to a data structure in a target format, to obtain the animation export file corresponding to the original animation file.

In the foregoing animation file processing apparatus 1900, processing is performed based on the original animation file, which, compared with implementing the animation file in a native code mode, can reduce development workload and lower costs. In addition, bitmap images in the bitmap image sequence corresponding to the original animation file are converted into the encoded pictures in a picture format for storage, and various animation characteristic data of the original animation file does not need to be stored, provided that frames of encoded pictures are stored, so that all complex animation effects can be supported. In addition, when being decoded, the animation export file needs to be decoded only according to the picture format, thereby achieving high decoding efficiency. Moreover, because a difference between adjacent bitmap images is relatively small, performing pixel comparison between the current bitmap image and the corresponding key bitmap image, to obtain a differential pixel region in the current bitmap image, and encoding only the pixel data of the differential pixel region, to obtain the encoded picture, can reduce the size of the whole animation export file.

Figure 20:
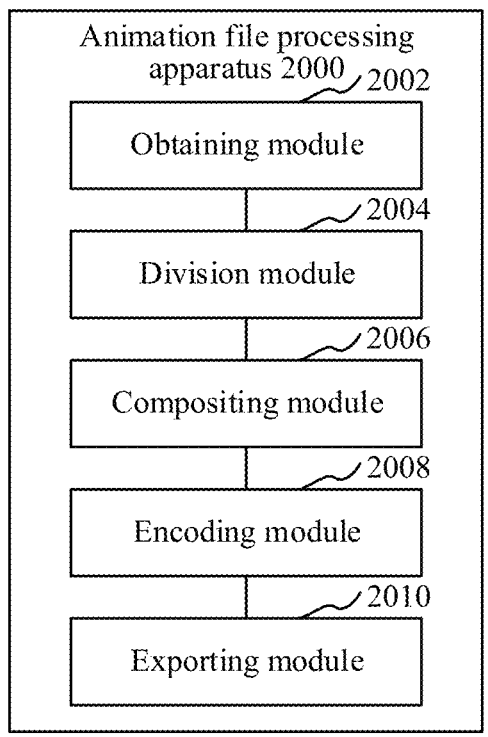
FIG. 20 is a structural block diagram of an animation file processing apparatus according to another embodiment.

In an embodiment, as shown in FIG. 20, an animation file processing apparatus 2000 is provided. The apparatus includes an obtaining module 2002, a division module 2004, a compositing module 2006, an encoding module 2008, and an exporting module 2010.

The obtaining module 2002 is configured to obtain a bitmap image sequence corresponding to an original animation file.

The division module 2004 is configured to extract a color channel bitmap and a transparency channel bitmap from each bitmap image in the bitmap image sequence.

The compositing module 2006 is configured to composite the color channel bitmap with the transparency channel bitmap, to obtain a composite bitmap.

The encoding module 2008 is configured to encode the composite bitmap according to a video encoding mode, to obtain an encoded picture corresponding to the bitmap image.

The exporting module 2010 is configured to generate an animation export file corresponding to the original animation file according to encoded pictures corresponding to bitmap images in the bitmap image sequence.

In an embodiment, the obtaining module 2002 is further configured to: obtain the original animation file; play the original animation file; and sequentially capture screenshots of playback screens corresponding to the original animation file, to obtain the bitmap image sequence corresponding to the original animation file.

In an embodiment, the division module 2004 is further configured to: obtain pixel data of pixels in the bitmap image; and extract color data and transparency data corresponding to the pixels from the pixel data; generate the color channel bitmap corresponding to the bitmap image according to the color data of the pixels; and generate the transparency channel bitmap corresponding to the bitmap image according to the transparency data of the pixels.

In the foregoing animation file processing apparatus 2000, processing is performed based on the original animation file, which, compared with implementing the animation file in a native code mode, can reduce development workload and lower costs. In addition, the color channel bitmap and the transparency channel bitmap are extracted from the bitmap image, the color channel bitmap is then composited with the transparency channel bitmap, to obtain the composite bitmap, and the composite bitmap is then encoded according to the video encoding mode, to obtain the encoded picture corresponding to the bitmap image, so that the animation export file generated according to the encoded pictures has a smaller file size, and the animation export file can be decoded according to the video decoding mode, thereby achieving higher decoding efficiency.

Figure 21:
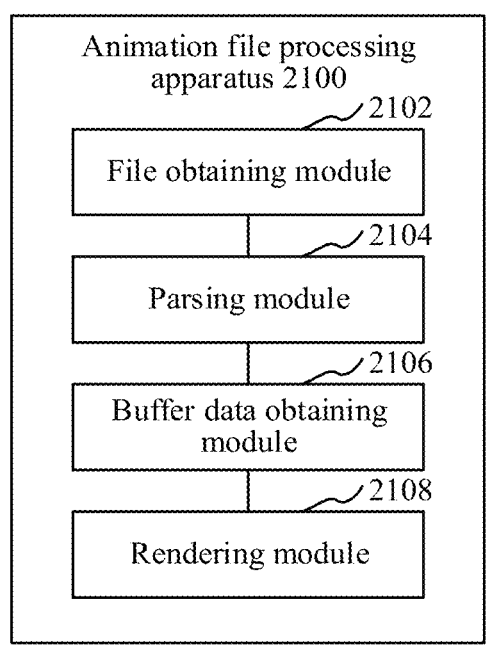
FIG. 21 is a structural block diagram of an animation file processing apparatus according to still another embodiment.

In an embodiment, as shown in FIG. 21, an animation file processing apparatus 2100 is provided. The apparatus includes a file obtaining module 2102, a parsing module 2104, a buffer data obtaining module 2106, and a rendering module 2108.

The file obtaining module 2102 is configured to obtain an animation export file obtained by encoding animation vector data of an original animation file.

The parsing module 2104 is configured to parse the animation export file, to obtain a static range of animation drawing data corresponding to each layer.

The buffer data obtaining module 2106 is configured to obtain animation drawing data corresponding to a layer from a buffer when a to-be-processed frame belongs to the static range of the animation drawing data corresponding to the layer.

The rendering module 2108 is configured to perform animation rendering according to the animation drawing data of the to-be-processed frame corresponding to the each layer.

In an embodiment, the animation file processing apparatus 2100 further includes an animation drawing data parsing module, configured to: obtain, when the to-be-processed frame does not belong to the static range of the animation drawing data corresponding to the layer, or the animation drawing data corresponding to the layer does not have a static range, an animation object obtained by parsing the animation export file; and read the animation object to obtain the animation drawing data corresponding to the layer.

In an embodiment, the animation file processing apparatus 2100 further includes a static range traversal module, configured to: obtain a current rendering progress; calculate a frame number of the to-be-processed frame according to the rendering progress and a total frame number and total duration that correspond to the animation export file; traverse the static range of the animation drawing data corresponding to the each layer; and determine that the to-be-processed frame belongs to the static range of the animation drawing data corresponding to the layer when the frame number is found in the static range.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

In the foregoing animation file processing apparatus 2100, the static range of the animation drawing data corresponding to the layer refers to a frame sequence formed by a plurality of consecutive animation frames with unchanged layer attributes corresponding to a specific layer in the animation frames corresponding to the animation export file. When the to-be-processed frame needs to be displayed, the static range of the animation drawing data corresponding to the each layer needs to be traversed. When the to-be-processed frame belongs to the static range of the animation drawing data corresponding to the layer, the animation drawing data corresponding to the layer is directly obtained from the buffer, so that the buffer can be fully utilized to reduce the repeated calculation of the animation drawing data, and the animation rendering efficiency can be greatly improved.

Figure 22:
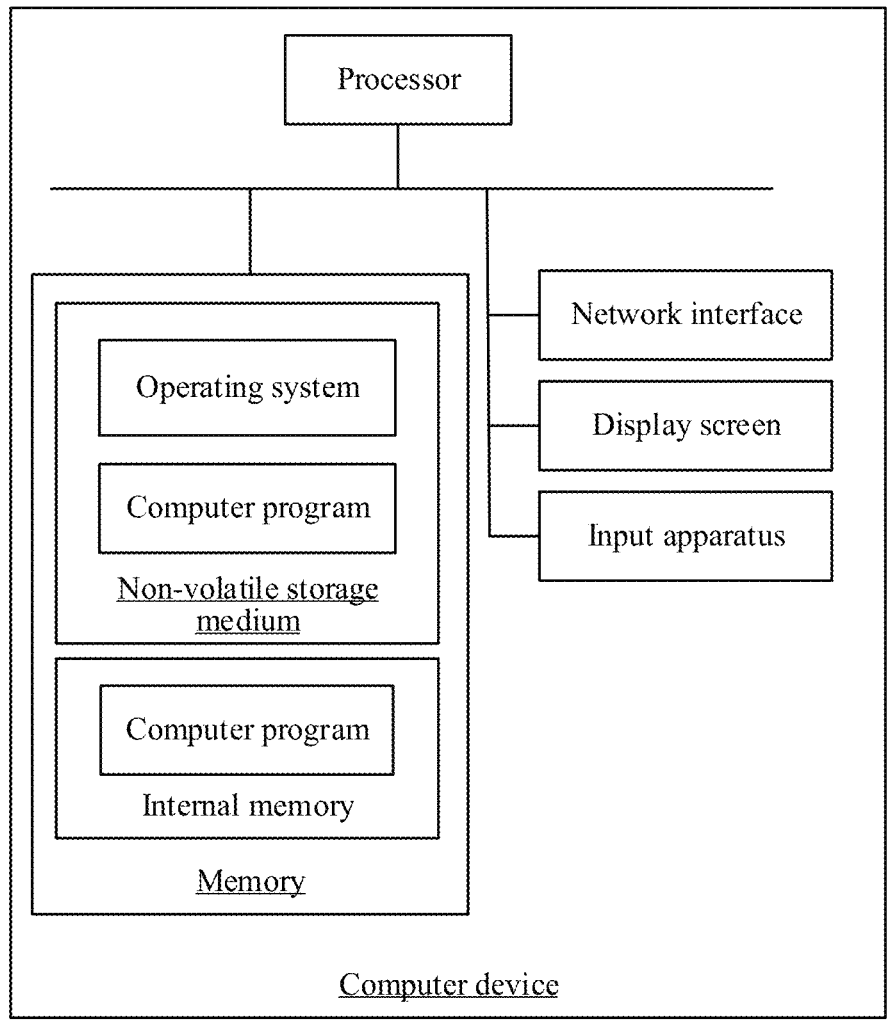
FIG. 22 is a structural block diagram of a computer device according to an embodiment.

FIG. 22 is a diagram of an internal structure of a computer device according to an embodiment. The computer device may be specifically each terminal in FIG. 1. As shown in FIG. 22, the computer device includes a processor, a memory, a network interface, an input apparatus, and a display screen that are connected by a system bus. The memory includes a non-volatile storage medium and an internal memory. The non-volatile storage medium of the computer device stores an operating system and may further store a computer program. The computer program, when executed by the processor, may cause the processor to implement the animation file processing method. The internal memory may also store a computer program. The computer program, when executed by the processor, may cause the processor to perform the animation file processing method. The display screen of the computer device may be a liquid crystal display screen or an e-ink display screen. The input device of the computer device may be a touch layer covering a display screen, or may be a button, a trackball, or a touch panel disposed on a housing of the computer device, or may be an external keyboard, a touch panel, or a mouse.

A person skilled in the art may understand that, the structure shown in FIG. 22 is only a block diagram of a part of a structure related to a solution of the present disclosure and does not limit the computer device to which the solution of the present disclosure is applied. Specifically, the computer device may include more or fewer components than those in the drawings, or include a combination of some components, or include different component layouts.

In an embodiment, the animation file processing apparatus 1900 provided in the present disclosure may be implemented in a form of a computer program, and the computer program may be run on the computer device shown in FIG. 22. The memory of the computer device may store program modules forming the animation file processing apparatus 1900, for example, the obtaining module 1902, the comparison module 1904, the encoding module 1906, and the exporting module 1908 shown in FIG. 19. The computer program formed by the program modules causes the processor to perform the steps of the animation file processing method in the embodiments of the present disclosure described in this specification.

For example, the computer device shown in FIG. 22 may perform step S302 by using the obtaining module 1902 in the animation file processing apparatus 1900 shown in FIG. 19. The computer device may perform step S304 by using the comparison module 1904. The computer device may perform step S306 by using the encoding module 1906. The computer device may perform step S308 by using the exporting module 1908.

In an embodiment, the animation file processing apparatus 2000 provided in the present disclosure may be implemented in a form of a computer program, and the computer program may be run on the computer device shown in FIG. 22. The memory of the computer device may store program modules forming the animation file processing apparatus 2000, for example, the obtaining module 2002, the division module 2004, the compositing module 2006, the encoding module 2008, and the exporting module 2010 shown in FIG. 20. The computer program formed by the program modules causes the processor to perform the steps of the animation file processing method in the embodiments of the present disclosure described in this specification.

For example, the computer device shown in FIG. 22 may perform step S902 by using the obtaining module 2002 in the animation file processing apparatus 2000 shown in FIG. 20. The computer device may perform step S904 by using the division module 2004. The computer device may perform step S906 by using the compositing module 2006. The computer device may perform step S908 by using the encoding module 2008. The computer device may perform step S910 by using the exporting module 2010.

In an embodiment, the animation file processing apparatus 2100 provided in the present disclosure may be implemented in a form of a computer program, and the computer program may be run on the computer device shown in FIG. 22. The memory of the computer device may store program modules forming the animation file processing apparatus 2100, for example, the file obtaining module 2102, the parsing module 2104, the buffer data obtaining module 2106, and the rendering module 2108 shown in FIG. 21. The computer program formed by the program modules causes the processor to perform the steps of the animation file processing method in the embodiments of the present disclosure described in this specification.

For example, the computer device shown in FIG. 22 may perform step S1502 by using the file obtaining module 2102 in the animation file processing apparatus 2100 shown in FIG. 21. The computer device may perform step S1504 by using the parsing module 2104. The computer device may perform step S1506 by using the buffer data obtaining module 2106. The computer device may perform step S1508 by using the rendering module 2108.

In an embodiment, a computer device is provided, including a processor and a memory, the memory storing a computer program, the computer program, when executed by the processor, causing the processor to perform the steps of the foregoing animation file processing method. The steps of the method may be the steps of the animation file processing method in the foregoing embodiments.

In an embodiment, a computer-readable storage medium is provided, storing a computer program, the computer program, when executed by a processor, causing the processor to perform the steps of the foregoing animation file processing method. The steps of the animation file processing method may be the steps of the animation file processing method in the foregoing embodiments.

A person of ordinary skill in the art may understand that some or all procedures in the method in the foregoing embodiments may be implemented by a computer program instructing related hardware. The program may be stored in a non-volatile computer-readable storage medium, and when the program is executed, the procedures in the foregoing method embodiments may be implemented. Any reference to a memory, a storage, a database, or another medium used in the embodiments provided in the present disclosure may include a non-volatile and/or volatile memory. The non-volatile memory may include a read-only memory (ROM), a programmable ROM (PROM), an electrically programmable ROM (EPROM), an electrically erasable programmable ROM (EEPROM), a flash memory, or the like. The volatile memory may include a random access memory (RAM) or an external cache. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a rambus direct RAM (RDRAM), a direct rambus dynamic RAM (DRDRAM), and a rambus dynamic RAM (RDRAM).

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope described in this specification.

The foregoing embodiments only describe several implementations of the present disclosure, which are described specifically and in detail, but cannot be construed as a limitation to the patent scope of the present disclosure. A person of ordinary skill in the art may further make variations and improvements without departing from the ideas of the present disclosure. The variations and improvements fall within the protection scope of the present disclosure. Therefore, the protection scope of the present disclosure is subject to the protection scope of the appended claims.

What is claimed is:

1. An animation file processing method, performed by a computer device, the method comprising:
   obtaining a bitmap image sequence corresponding to an original animation file;
   encoding a differential pixel region between a bitmap image in the bitmap image sequence and a corresponding key bitmap image according to a picture encoding mode when the bitmap image is a non-key bitmap image, to obtain an encoded picture corresponding to the bitmap image; and
   generating an animation export file corresponding to the original animation file according to encoded pictures corresponding to bitmap images in the bitmap image sequence and according to a bitmap sequence frame export mode,
   wherein the method further comprises:
   extracting a color channel bitmap and a transparency channel bitmap from the bitmap image;
   compositing the color channel bitmap with the transparency channel bitmap, to obtain a composite bitmap;
   encoding the composite bitmap, to obtain an encoded composite picture corresponding to the bitmap image; and
   generating the animation export file corresponding to the original animation file according to encoded composite pictures corresponding to bitmap images in the bitmap image sequence and according to a video sequence frame export mode, the video sequence frame export mode comprising a sequence frame export parameter and a general export parameter in relation to exporting the animation export file.

2. The method according to claim 1, further comprising:
   directly encoding the bitmap image when the bitmap image in the bitmap image sequence is a key bitmap image, to obtain an encoded picture corresponding to the bitmap image.

3. The method according to claim 1, wherein the obtaining a bitmap image sequence corresponding to an original animation file comprises:
   obtaining the original animation file;
   playing the original animation file; and
   sequentially capturing screenshots of playback screens corresponding to the original animation file, to obtain the bitmap image sequence corresponding to the original animation file.

4. The method according to claim 1, wherein the differential pixel region is obtained by:
   performing pixel comparison between the non-key bitmap image in the bitmap image sequence and the corresponding key bitmap image, to obtain differential pixels in the non-key bitmap image; and
   determining the differential pixel region in the non-key bitmap image according to the differential pixels.

5. The method according to claim 4, wherein the performing pixel comparison between the non-key bitmap image in the bitmap image sequence and the corresponding key bitmap image, to obtain differential pixels in the non-key bitmap image comprises:
   obtaining pixel data of pixels in the key bitmap image corresponding to the bitmap image;
   obtaining pixel data of pixels in the non-key bitmap image;
   comparing pixel data of pixels at same positions, to obtain a comparison result; and
   determining the differential pixels in the non-key bitmap image according to the comparison result.

6. The method according to claim 1, wherein the differential pixel region is a rectangular pixel region, and the method further comprises:
   determining that the bitmap image is a key bitmap image when a difference between a size of the rectangular pixel region and a size of the bitmap image is less than a preset threshold; and
   determining that the bitmap image is a non-key bitmap image when the difference between the size of the rectangular pixel region and the size of the bitmap image is greater than the preset threshold.

7. The method according to claim 1, further comprising:
   selecting the first bitmap image in the bitmap image sequence as the key bitmap image; and
   using a bitmap image at intervals of a preset quantity of bitmap images as a key bitmap image in the bitmap image sequence by using the first bitmap image as a starting image.

8. The method according to claim 1, wherein the differential pixel region is a rectangular pixel region, and the method further comprises:
   determining a pixel width and a pixel height that correspond to the rectangular pixel region and coordinates of a starting pixel in the rectangular pixel region;
   storing the pixel width, the pixel height, and the coordinates of the starting pixel into picture information corresponding to the encoded picture of the non-key bitmap image.

9. The method according to claim 1, further comprising:
   obtaining animation vector data of the original animation file, the animation vector data comprising animation basic-attribute data and animation layer data; and
   storing the animation basic-attribute data and the animation layer data according to a data structure in a target format, to obtain the animation export file corresponding to the original animation file according to a vector export mode.

10. The method according to claim 1, wherein:
the general export parameter, in response to exporting the animation export file, controls image compression quality, a TAG level, and export version, and
the sequence frame export parameter controls export size upper limit, key frame interval, scale ratio, and frame rate.

11. The method according to claim 1, further comprises:
displaying a configuration interface configured to receive an input from the computer device;
obtaining the sequence frame export parameter and the general export parameter from the configuration interface; and
in response to the exporting the animation export file, generating the animation export file based on the obtained sequence frame export parameter and the obtained general export parameter.

12. An animation file processing apparatus, comprising at least one memory and at least one processor, the at least one memory storing a computer program, the computer program, when executed by the at least one processor, causing the at least one processor to:
obtain a bitmap image sequence corresponding to an original animation file;
encode a differential pixel region between a bitmap image in the bitmap image sequence and a corresponding key bitmap image when the bitmap image is a non-key bitmap image, to obtain an encoded picture corresponding to the bitmap image; and
generate an animation export file corresponding to the original animation file according to encoded pictures corresponding to bitmap images in the bitmap image sequence and according to a bitmap sequence frame export mode,
wherein the computer program further causes the at least one processor to:
extract color channel bitmap and a transparency channel bitmap from the bitmap image;
composite the color channel bitmap with the transparency channel bitmap, to obtain a composite bitmap;
encode the composite bitmap, to obtain an encoded composite picture corresponding to the bitmap image; and
generate the animation export file corresponding to the original animation file according to encoded composite pictures corresponding to the bitmap images in the bitmap image sequence and according to a video sequence frame export mode, the video sequence frame export mode comprising a sequence frame export parameter and a general export parameter in relation to exporting the animation export file.

13. The apparatus according to claim 12, wherein the computer program further causes the at least one processor to:
directly encode the bitmap image when the bitmap image in the bitmap image sequence is a key bitmap image, to obtain an encoded picture corresponding to the bitmap image.

14. The apparatus according to claim 12, wherein the computer program further causes the at least one processor to,
perform pixel comparison between the non-key bitmap image in the bitmap image sequence and the corresponding key bitmap image, to obtain differential pixels in the non-key bitmap image; and determine the differential pixel region in the non-key bitmap image according to the differential pixels.

15. A non-transitory computer-readable storage medium, storing a computer program, the computer program, when executed by at least one processor, causing the at least one processor to perform:
obtaining a bitmap image sequence corresponding to an original animation file;
encoding a differential pixel region between a bitmap image in the bitmap image sequence and a corresponding key bitmap image according to a picture encoding mode when the bitmap image is a non-key bitmap image, to obtain an encoded picture corresponding to the bitmap image; and
generating an animation export file corresponding to the original animation file according to encoded pictures corresponding to bitmap images in the bitmap image sequence and according to a bitmap sequence frame export mode,
wherein the computer program further causes the at least one processor to perform:
extracting a color channel bitmap and a transparency channel bitmap from the bitmap image;
compositing the color channel bitmap with the transparency channel bitmap, to obtain a composite bitmap;
encoding the composite bitmap, to obtain an encoded composite picture corresponding to the bitmap image; and
generating the animation export file corresponding to the original animation file according to encoded composite pictures corresponding to bitmap images in the bitmap image sequence and according to a video sequence frame export mode, the video sequence frame export mode comprising a sequence frame export parameter and a general export parameter in relation to exporting the animation export file.

16. The non-transitory computer-readable storage medium according to claim 15, wherein the computer program, when executed by the at least one processor, causes the at least one processor to further perform:
directly encoding the bitmap image when the bitmap image in the bitmap image sequence is a key bitmap image, to obtain an encoded picture corresponding to the bitmap image.

17. The non-transitory computer-readable storage medium according to claim 15, wherein the computer program, when the operation of obtaining a bitmap image sequence corresponding to an original animation file is performed by the at least one processor, causes the at least one processor to perform:
obtaining the original animation file;
playing the original animation file; and
sequentially capturing screenshots of playback screens corresponding to the original animation file, to obtain the bitmap image sequence corresponding to the original animation file.

18. The non-transitory computer-readable storage medium according to claim 15, wherein the computer program, when executed by the at least one processor, causes the at least one processor to further perform:
performing pixel comparison between the non-key bitmap image in the bitmap image sequence and the corresponding key bitmap image, to obtain differential pixels in the non-key bitmap image; and
determining the differential pixel region in the non-key bitmap image according to the differential pixels.

19. The non-transitory computer-readable storage medium according to claim 18, wherein the performing pixel comparison between the non-key bitmap image in the bitmap image sequence and the corresponding key bitmap image, to obtain differential pixels in the non-key bitmap image comprises:
   obtaining pixel data of pixels in the key bitmap image corresponding to the bitmap image;
   obtaining pixel data of pixels in the non-key bitmap image;
   comparing pixel data of pixels at same positions, to obtain a comparison result; and
   determining the differential pixels in the non-key bitmap image according to the comparison result.

20. The non-transitory computer-readable storage medium according to claim 15, wherein the differential pixel region is a rectangular pixel region, and the computer program further causes the at least one processor to perform:
   determining that the bitmap image is a key bitmap image when a difference between a size of the rectangular pixel region and a size of the bitmap image is less than a preset threshold; and
   determining that the bitmap image is a non-key bitmap image when the difference between the size of the rectangular pixel region and the size of the bitmap image is greater than the preset threshold.

\* \* \* \* \*